(12) United States Patent
Georges et al.

(10) Patent No.: US 10,095,693 B2
(45) Date of Patent: Oct. 9, 2018

(54) TECHNIQUES FOR GENERATING A CLUSTERED REPRESENTATION OF A NETWORK BASED ON NODE DATA

(71) Applicant: SAS Institute Inc., Cary, NC (US)

(72) Inventors: James Edward Georges, Irvine, CA (US); Dan Kelly, Raleigh, NC (US); Jin-Whan Jung, Chapel Hill, NC (US); John Clarke Brocklebank, Raleigh, NC (US); Adheesha Sanjaya Arangala, Chapel Hill, NC (US); Julius Alton King, Bullock, NC (US)

(73) Assignee: SAS Institute Inc., Cary, NC (US)

( * ) Notice: Subject to any disclaimer, the term of this patent is extended or adjusted under 35 U.S.C. 154(b) by 640 days.

(21) Appl. No.: 14/709,601

(22) Filed: May 12, 2015

(65) Prior Publication Data
US 2015/0331932 A1 Nov. 19, 2015

Related U.S. Application Data

(60) Provisional application No. 61/992,369, filed on May 13, 2014.

(51) Int. Cl.
*G06F 17/00* (2006.01)
*G06F 17/30* (2006.01)
(Continued)

(52) U.S. Cl.
CPC ........ *G06F 17/30* (2013.01); *G06F 17/30601* (2013.01); *G06K 9/6218* (2013.01);
(Continued)

(58) Field of Classification Search
CPC .................................. H04L 41/0896
(Continued)

(56) References Cited

U.S. PATENT DOCUMENTS

| 6,049,773 A * | 4/2000 | McCormack | G06Q 40/08 705/4 |
| 9,552,587 B2 * | 1/2017 | Naqvi | G06Q 30/0205 |

OTHER PUBLICATIONS

Hulot, Yannic, "VAT Fraud", Parliamentary Seminar of the Baltic Assembly and Benelux Parliament, Sep. 26, 2013, 27 pages.
(Continued)

*Primary Examiner* — David R Vincent

(57) ABSTRACT

An apparatus includes a communications component to receive a specified variable and one or more specified criteria to select a final clustered representation of a network, the specified criteria including a maximum degree of loss of information for the specified variable for the final clustered representation; and an iterative collapse component to perform iteration(s) of deriving the final clustered representation. Each iteration includes calculating the degree of loss from each possible combination of two linked nodes of a current clustered representation to generate a next clustered representation; selecting the possible combination associated with a smallest degree of loss; determining whether to cease iterations based on whether the smallest degree associated with the selected combination exceeds the maximum degree; effecting the selected combination if the smallest degree doesn't exceed the maximum degree; and selecting the current clustered representation as the final clustered representation if the smallest degree exceeds the maximum degree.

33 Claims, 18 Drawing Sheets

(51) Int. Cl.
*G06T 11/20* (2006.01)
*G06K 9/62* (2006.01)
*H04L 12/26* (2006.01)
*H04L 12/24* (2006.01)

(52) U.S. Cl.
CPC .......... *G06K 9/6219* (2013.01); *G06T 11/206* (2013.01); *H04L 41/0896* (2013.01); *H04L 43/16* (2013.01)

(58) Field of Classification Search
USPC .................................................. 706/15, 45
See application file for complete search history.

(56) References Cited

OTHER PUBLICATIONS

Patel et al., "Design and Implementation of Computation Grid, Measure & Improve Performance Parameter:—A Survey", International Journal of Engineering and Innovative Technology (IJEIT), vol. 2, Issue 7, Jan. 2013, 3 pages.
Bliss et al., "Interactive Grid Computing at Lincoln Laboratory", Lincoln Laboratory Journal, vol. 16, No. 1, 2006, 52 pages.
Brocklebank, John C., "SAS Fraud Framework for Banking", SAS Institute, 2008, 17 pages.
Watts et al., "Collective dynamics of 'small-world' networks", Nature (1998), 3 pages.
Albert, et al., "Statistical mechanics of complex networks", Reviews of Modern Physics 74: 47-97M.
Newman et al., "The Structure and Dynamics of Networks", (Princeton University Press, 2006), 58 pages.
Fisher, R. A., "The Use of Multiple Measurements in Taxonomic Problems", Annals of Eugenics, 7, (1936), 10 pages.

\* cited by examiner

TECHNIQUES FOR GENERATING A CLUSTERED REPRESENTATION OF A NETWORK BASED ON NODE DATA

CROSS-REFERENCE TO RELATED APPLICATIONS

This application claims the benefit of priority under 35 U.S.C. § 119(e) to U.S. Provisional Application Ser. No. 61/992,369 entitled COMPUTER-IMPLEMENTED SYSTEM AND METHODS FOR CLUSTERING NETWORKED OBSERVATIONS IN LARGE DATA SETS (NETCHAID) filed May 13, 2014, the entirety of which is incorporated herein by reference.

BACKGROUND

Networks of many types and varieties continue to grow in size and complexity. This begets the challenge of representing data associated with nodes of a network in a form that is easily understandable and/or useable as input to further analysis to enable useful conclusions to be derived.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, wherein the computer-program product may include instructions operable to cause a computing device to perform operations including receive an indication of a specified variable for which each node of a network is associated with a value; receive an indication of one or more specified criteria to select a final clustered representation of the network, the one or more specified criteria comprising a maximum degree of loss of information concerning the specified variable associated with the final clustered representation; and operations of an iteration of derivation of the final clustered representation. The operations of the iteration may include calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network; selecting one of the possible combinations of two linked nodes of the current clustered representation that is associated with a smallest degree of loss of information concerning the specified variable to combine into a single node; determining whether to cease performance of iterations based on whether the smallest degree of loss associated with the selected combination exceeds the maximum degree of loss of information; effecting the selected combination of two linked nodes of the current clustered representation to generate the next clustered representation in response to a determination that the smallest degree of loss does not exceed the maximum degree of loss; and selecting the current clustered representation as the final clustered representation in response to a determination that the smallest degree of loss exceeds the maximum degree of loss.

A computer-implemented method may include receiving an indication of a specified variable for which each node of a network is associated with a value; receiving an indication of one or more specified criteria to select a final clustered representation of the network, the one or more specified criteria comprising a maximum degree of loss of information concerning the specified variable associated with the final clustered representation; and performing an iteration of derivation of the final clustered representation. Performing the iteration may include calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network; selecting one of the possible combinations of two linked nodes of the current clustered representation that is associated with a smallest degree of loss of information concerning the specified variable to combine into a single node; determining whether to cease performance of iterations based on whether the smallest degree of loss associated with the selected combination exceeds the maximum degree of loss of information; effecting the selected combination of two linked nodes of the current clustered representation to generate the next clustered representation in response to a determination that the smallest degree of loss does not exceed the maximum degree of loss; and selecting the current clustered representation as the final clustered representation in response to a determination that the smallest degree of loss exceeds the maximum degree of loss.

An apparatus may include a processor component; a communications component for execution by the processor component to receive an indication of a specified variable for which each node of a network is associated with a value, and to receive an indication of one or more specified criteria to select a final clustered representation of the network, the one or more specified criteria comprising a maximum degree of loss of information concerning the specified variable associated with the final clustered representation; and an iterative collapse component for execution by the processor component to perform an iteration of derivation of the final clustered representation. Performing the iteration may include calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network; selecting one of the possible combinations of two linked nodes of the current clustered representation that is associated with a smallest degree of loss of information concerning the specified variable to combine into a single node; determining whether to cease performance of iterations based on whether the smallest degree of loss associated with the selected combination exceeds the maximum degree of loss of information; effecting the selected combination of two linked nodes of the current clustered representation to generate the next clustered representation in response to a determination that the smallest degree of loss does not exceed the maximum degree of loss; and selecting the current clustered representation as the final clustered representation in response to a determination that the smallest degree of loss exceeds the maximum degree of loss.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
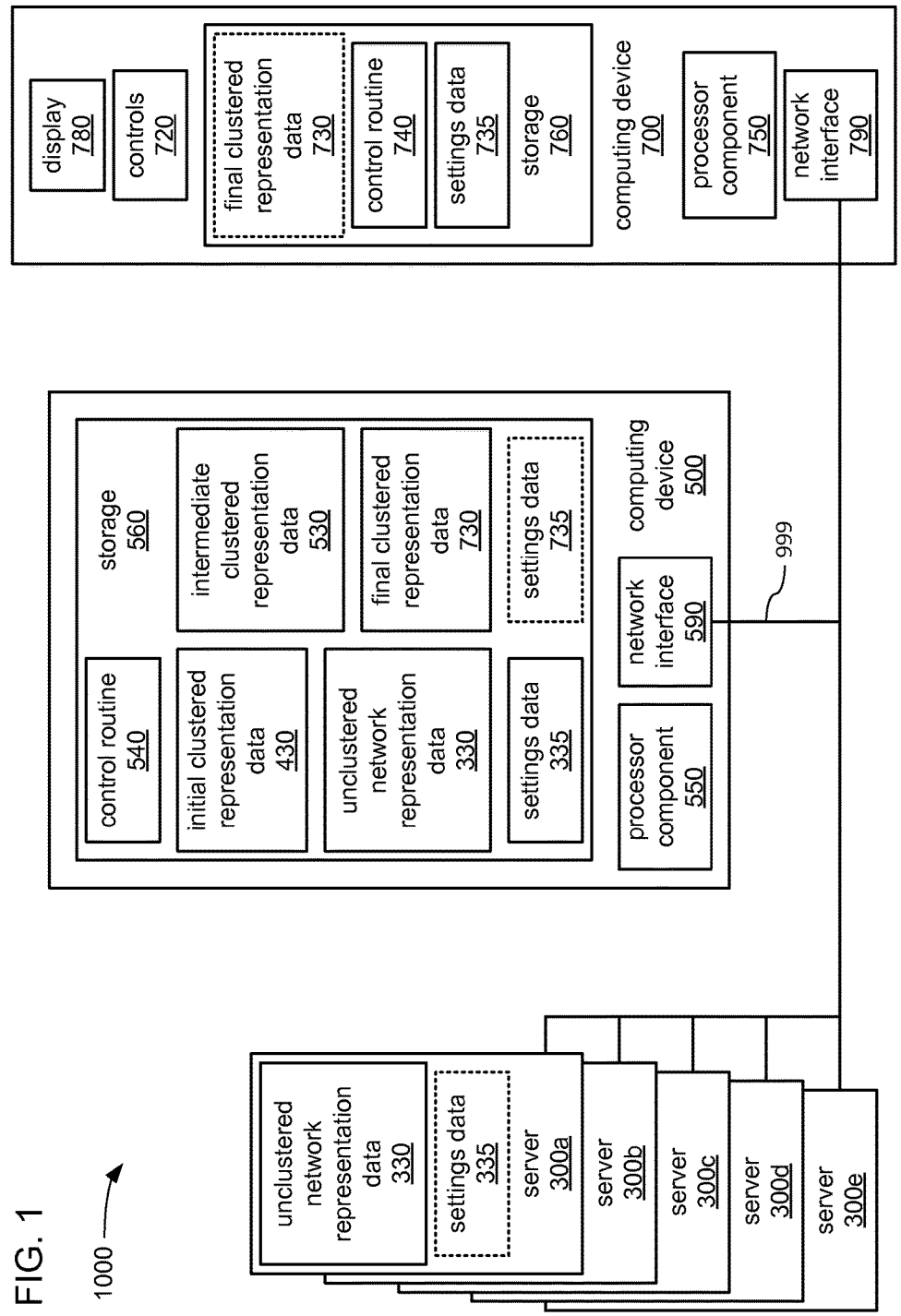
FIG. 1 illustrates an example embodiment of a network analysis system.

Various embodiments described herein are generally directed to techniques for generating a clustered representation of a network based on values of a selected variable at the nodes of the network, either for visualization or as an input to further analysis. A particular variable associated with the nodes of a relatively large and/or complex network may be specified for analysis. An initial clustered representation of the network may be generated by collapsing together nodes that are directly linked to each other and that have like values for the specified variable. An initial measure may be taken of the amount of information associated with the specified variable that is present in the initial clustered representation, and that measure may serve as a baseline measurement. Then, starting with the initial clustered representation of the network, further clustered representations of the network may be iteratively generated in which each new clustered representation is collapsed to have one fewer node than the last clustered representation by combining two directly linked nodes having different values for the specified variable. In each such iteration, multiple combinations of directly linked pairs of nodes having different values for the specified variable are individually evaluated as a candidate pair of nodes to combine to attempt to identify one directly linked pair of nodes having such different values that may be combined to generate the next clustered representation of the network while minimizing the resulting reduction in the amount of information associated with the specified variable in the resulting clustered representation. The iterations may continue until a final clustered representation of the network is generated during an iteration that meets one or more specified criteria. The final clustered representation of the network may then be provided as an input to a further analysis process, and/or a visualization of the network may be generated based on the clustered representation.

A network of which one or more clustered representations may be generated may be any of a variety of types of network, including and not limited to, a social network, a telephone network, a networks of individuals who may each be associated with a particular activity, a network of computing devices, etc. An operator of a computing device associated with generating one or more clustered representations may specify a variable associated with the nodes of the network on which the generation of the one or more clustered representations is to be based. Such a variable may be any of a variety of types of observation or data associated with the nodes. By way of example, where the network is of individuals who may each be associated with an illegal activity, each of those individuals may be one of the nodes, the links extending between two of the nodes may represent a binary indication of those two individuals having corresponded directly, and the specified variable may be a binary indication of whether each person is known (or at least believed) to have engaged in the illegal activity.

Regardless of what the nodes and/or links of the network represent, and regardless of what variable associated with the nodes may be specified, the network may include such a large quantity of nodes and/or the manner in which the nodes are linked may be sufficiently complex that effective visualization and/or analysis of the specified variable throughout the network may be deemed excessively difficult. Thus, despite the potential loss of information concerning values of the specified variable at various nodes, it may be deemed desirable to generate a clustered representation of the network that can be more practicably visualized and/or analyzed.

In particular, each node and/or each link added to a network may exponentially increase the quantity of possible ways in which nodes may be combined. Employing a computing device to randomly combine nodes to generate a clustered representation in a manner mimicking how a person might approach such a task would be statistically likely to result in the creation of a clustered representation that is relatively ineffective at revealing connections between nodes and/or localized behavior among more closely linked nodes as a result of the loss of too much information due to such random combining. This might be countered by causing that computing device to generate a great many clustered representations through such random combining of nodes, followed by an evaluation of each of those generated clustered representations to select one of the clustered representations as the final clustered representation. However, such an approach would consume considerable processing and storage resources over a prolonged period of time to both randomly generate and evaluate each of those clustered representations.

However, by determining the degree of loss of information associated with possible combinations of pairs of nodes as pairs of nodes to be combined are selected during the generation of a single final clustered representation as described herein, the range of possible combinations of pairs of nodes to be subsequently evaluated is progressively and relatively quickly narrowed. As a result, a final clustered representation of a network that preserves a greater amount of information is generated in less time through more efficient use of processing resources.

An iterative process may be performed to evaluate and/or generate a succession of clustered representations of the network in which each new clustered representation includes one fewer node than the last clustered representation until a final clustered representation is identified and/or generated that meets specified criteria that may be so specified by an operator of a computing device associated with the iterative process. As will be explained in greater detail, the reduction in the quantity of nodes by one to generate a next clustered representation may be made by selecting a linked pair of nodes with relatively less dissimilar values for the specified variable to combine into a single node. Such selection and combining of a single pair of such nodes to generate a next clustered representation in an iteration may continue until a clustered representation is generated that is deemed the final clustered representation due to the specified criteria having been met. The specified criteria may include, and are not limited to, one or more of a maximum degree of loss of information associated with the specified variable, a maximum quantity of nodes to be included in the final clustered representation of the network, a maximum amount of time allowed for generating the clustered representations, etc.

Prior to the iterative evaluation and/or generation of clustered representations leading to what is deemed the final clustered representation, an initial clustered representation of the network may be generated from an unclustered representation of the network as it actually exists, and this initial clustered representation may be generated by collapsing the unclustered representation in a manner that does not entail any loss of information associated with the specified variable. More precisely, starting with the unclustered representation of the network (e.g., a representation of the network as it actually exists with none of the nodes clustered), at every location in the network at which there are two or more directly linked nodes that share the same value for the specified variable, those nodes may be combined to generate the initial clustered representation. As recognizable to those skilled in the art, depending on the manner in which values of the specified variable are distributed among the nodes, there may be more than one location within the network at which there are two or more directly linked nodes that share the same value of the specified variable such that there may be more than one location in the network at which such combining of two or more nodes into a single node occurs.

As a result of such combining(s) of nodes with like values of the specified variable, only pairs of directly linked nodes that have dissimilar values for the specified variable may remain in the initial clustered representation. Then, an initial measure may be taken of the amount of information concerning the specified variable that is provided in the initial clustered representation of the network. Due to this initial collapsing of the nodes entailing the combining only of directly linked nodes with like values of the specified variable, there will be no loss of information concerning the specified variable from the original unclustered representation of the actual network. In various embodiments, any of a variety of statistical measures may be used in taking this initial measure, including but not limited to a Pearson Chi-squared ($\chi^2$) statistic, a F-test, a p-value or a logworth of the p-value.

In the first iteration of the iterative evaluation and/or generation of a clustered representation of the network, each directly linked pair of nodes of the initial clustered representation is evaluated to determine the degree of loss of information concerning the specified variable that would occur if that pair of nodes were combined to reduce the quantity of nodes by one to generate the next clustered representation. Again, as a result of the generation of the initial clustered representation, all pairs of directly linked nodes in the initial clustered representation have differing values for the selected variable. Thus, the combining of any two directly linked nodes of the initial clustered representation will necessarily result in a loss of information associated with the selected variable. Therefore, for each pair of directly linked nodes that could be combined into a single node to generate the next clustered representation, a calculation may be performed to obtain a measure of the amount of information concerning the specified variable that would be provided by the next clustered representation if the next clustered representation were generated by combining that pair of directly linked nodes. Then, for each such pair of directly linked nodes that could be so combined into a single node, that measure is compared to the initial measure earlier made of the amount of information concerning the specified variable that is provided by the initial clustered representation to determine the degree of loss of information. The pair of directly linked nodes that is found to be associated with the smallest degree of loss may then be selected to be the pair that are combined to generate the next clustered representation.

This approach to selecting a pair of nodes to combine and/or the actual combining of that selected pair of nodes to generate a next clustered representation from the last clustered representation may be repeated in each iteration. In this way, each new clustered representation generated in an iteration has one fewer nodes than the last clustered representation generated in such an iteration until a new clustered representation is generated that meets the specified criteria, and that new clustered representation that meets the specified criteria may then be deemed to be the final clustered representation.

In some embodiments, a visualization may be automatically generated from the final clustered representation. In such an automatically generated visualization, shading, color coding and/or another form of visual cue may be employed to indicate the value(s) of the specified variable at each of the nodes. In some embodiments, input from a viewer of the automatically generated visualization may be acted upon to automatically generate a new visualization that is based on a subset of the nodes of the original visualization that are indicated to be of interest, while ignoring the others. Such automatic generation of such a new visualization may entail using the aforedescribed approach to generate a new final clustered representation of only the portion of the network that includes the subset of nodes, but leaves out the others.

In other embodiments, the final clustered representation may be employed as an input to a further analysis. This may entail transmitting data of the final clustered representation to another computing device at which at least a portion of the further analysis is to be performed.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a network analysis system 1000 incorporating one or more servers 300a-e, a computing device 500 and/or a computing device 700. As depicted, these computing devices 300a-e, 500 and 700 may exchange communications conveying unclustered network representation data 330, settings data 335, final clustered representation data 730 and/or settings data 735 through a network 999 in support of generating, visualizing and/or analyzing clustered representations of a network. However, one or more of the computing devices 300a-e, 500 and/or 700 may exchange other data entirely unrelated to representations of a network with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The network represented by at least the unclustered network representation data 330 and the final clustered representation data 730 may be any of a variety of types of network, including and not limited to, a network coupling computing devices and/or other devices, a telephone network, a social network of family members and/or friends, a criminal network of individuals who may at least be suspected of involvement in a criminal activity, a network of organizations cooperating to serve a charitable or commercial purpose, etc. In some embodiments, the network so represented may be the network 999, itself. As depicted, the unclustered network representation data 330 may be stored within one or more of the servers 300a-e awaiting retrieval by the computing device 500. Alternatively, the unclustered network representation data 330 may be compiled or otherwise derived from a search of greater quantities of data maintained by one or more of the servers 300a-e, and the search may be conducted among one or more of the servers 300a-e in response to a request transmitted thereto from the computing device 500. It should be noted that although a quantity of five servers 300a-e is specifically depicted as storing and/or deriving the unclustered network representation data 330, other quantities of computing devices may be employed in deriving and/or providing the unclustered network representation data 330 to the computing device 500. It should also be noted that although a single computing device 500 is specifically depicted as deriving the final clustered representation data 730 from the unclustered network representation data 330, other quantities of computing devices may be employed in deriving final clustered representation data 730.

In various embodiments, the computing device 500 incorporates one or more of a processor component 550, a storage 560 and a network interface 590 to couple the computing device 500 to the network 999. The storage 560 may store one or more of each of the unclustered network representation data 330, a settings data 335, an initial clustered representation data 430, one or more instances of intermediate clustered representation data 530, the final clustered representation data 730 and settings data 735. The control routine 540 may incorporate a sequence of instructions operative on the processor component 550 to implement logic to perform various functions.

Regardless of whether the computing device 500 receives the unclustered network representation data 330 or derives it from a larger quantity of data stored among one or more of the servers 300a-e, the computing device 500 may derive the final clustered representation data 730 from the unclustered network representation data 330 based on a specified variable and controlled by one or more specified criteria. The specified variable and/or the specified criteria may be specified by an operator of the computing device 700 or of another computing device (not shown), and may be transmitted to the computing device 500 via the network within the settings data 335 from the one or more servers 300a-e and/or within the settings data 735 from the computing device 700.

The control routine 540 may be any of a variety of types of routine that generates one or more clustered representations of a network from a non-clustered representation, including and not limited to, a database query application, a spreadsheet application, etc. In executing the control routine 540, the processor component 550 may receive at least a portion of the unclustered network representation data 330 from one or more of the servers 300a-e via the network 999, and/or may generate at least a portion of the unclustered network representation data 330 from other data received from one or more of the servers 300a-e. Regardless of the exact manner in which the unclustered network representation data 330 is received and/or generated, the unclustered network representation data 330 may provide a representation of a network with none of its nodes clustered or otherwise combined with other(s) of the nodes of that network into a single node. Thus, the unclustered network representation data 330 may individually describe aspects of each single node of the network it represents and may individually describe aspects of each single link that exists between two nodes in the represented network.

Associated with each of the nodes of the network represented by the unclustered network representation data 330 may be value(s) for one or more variables that may be described in the unclustered network representation data 330. Depending on the nature of the represented network, each of the one or more variables may be any of a variety of types of measurement, status indication, or other form of observation made with regard to each of the nodes of the represented network. One or more of such variables may have binary values (e.g., on or off, or 1 or 0, etc.), may have more than two selectable discrete values (e.g., a so-called multiple choice selection of a, b, c, and so on), or may have a continuous range of values (e.g., a range of temperature values). In executing the control routine 540, the processor component 550 may receive an indication of which variable is the specified variable on which the clustering of nodes to generate clustered representation(s) of the represented network is to be based. This indication may be provided to the computing device 500 within the settings data 335 that may accompanied the unclustered network representation data 330 from one or more of the servers 300a-e, or within the settings data 735 that may be received from the computing device 700 to which the final clustered representation data 730 may be transmitted.

The processor component 550 may examine the value for the specified variable at each node described within the unclustered network representation data 330, and wherever there are two or more directly linked nodes that share the same value for the specified variable, the processor component 550 may combine those nodes into a single node as part of generating an initial clustered representation of the represented network. The processor component 550 may then store that initial clustered representation within the storage 560 as the initial clustered representation data 430. Again, depending on the manner in which values of the specified variable are distributed among the nodes, there may be more than one location within the represented network at which there are two or more directly linked nodes that share the same value of the specified variable such that there may be more than one location in the represented network at which such combining of two or more nodes into a single node may occur. Thus, presuming that the represented network includes at least two directly linked nodes that have the same value for the specified variable, the initial clustered representation of the network provided in the initial clustered representation data 430 should include at least one fewer node than the unclustered representation of the network in the unclustered network representation data 330 as a result of at least two of such nodes having been combined into one.

The processor component 550 may also calculate the amount of information concerning the specified variable that is provided by the in the initial clustered representation as an initial measure. Again, since the initial clustered representation is generated by combining only directly linked nodes described in the unclustered network representation data 330 that have the same value for the specified variable, and not by combining any nodes with dissimilar values for the specified variable, there is no loss of information concerning the specified variable in generating the initial clustered representation data 430 from the unclustered network representation data 330. Thus, the measure of information concerning the specified variable provided by the representations of either of the unclustered network representation data 330 or the initial clustered representation data 430 will be identical.

Following generation of the initial clustered representation data 430, the processor component 550 may then use the initial clustered representation of the network provided by the initial clustered representation data 430 as the starting point for performing one or more iterations of generating further clustered representations of the network in which each new clustered representation includes one fewer node than the last. Again, each such reduction in the quantity of nodes by one in each such iteration may be made by selecting a directly linked pair of nodes with dissimilar values for the specified variable to combine into a single node. As part of selecting the directly linked pair of nodes to be combined to generate one of the clustered representations during one of the iterations, the processor component 550 may, for each pair of directly linked nodes that might be selected to be combined, calculate the amount of information concerning the specific variable that would be provided in the clustered representation that would result if that pair of directly linked nodes were combined. The processor component 550 may then compare the amounts of information associated with each such pair of directly linked nodes to the initial measure to determine which pair of directly linked nodes would cause the smallest degree of loss of information by being combined. The processor component 550 may then select the pair of directly linked nodes that is associated with the smallest degree of loss and may combine them to generate the next clustered representation during that iteration.

As the processor component 550 performs each iteration, each new clustered representation that results may be stored as at least a portion of the intermediate clustered representation data 530. Also stored with each new clustered representation generated in one of such iterations may be an indication of the amount of information concerning the specified variable that is provided by that new clustered representation. As will be explained in greater detail, such an indication of the amount of such information provided by each clustered representation may be employed as an input to determining whether the final clustered representation of the network has been generated.

In some embodiments, the newest clustered representation generated during the most recent iteration may be stored as the intermediate clustered representation data 530 in a manner in which any previous clustered representations generated in previous iterations may be replaced (e.g., overwritten) such that none of the clustered representation generated during any of the earlier iterations are preserved. Thus, the intermediate clustered representation data 530 may include only the newest of the clustered representations generated in such an iteration. However, in other embodiments, each of the clustered representations generated in all of the iterations may be stored as part the intermediate clustered representation data 530 in a manner that preserves all of those clustered representations leading up to and including the newest clustered representation. As will be explained in greater detail, such preservation of all of such clustered representations may be useful where it is desired to retrace the path by which nodes are combined to generate each of the clustered representations.

The processor component 550 may continue performing iterations until a clustered representation is generated in an iteration that is deemed the final clustered representation as a result of meeting the specified criteria. Again, the specified criteria may include, and is not limited to, one or more of a maximum degree of loss of information concerning the specified variable, a maximum quantity of nodes to be included in the final clustered representation, a maximum amount of time allowed for generating the clustered representations, etc. It should be noted that, depending on at least the specified criteria, the size and/or complexity of the network, and the distribution of values of the specified variable among the nodes of the network, generation of the final clustered representation may require multiple iterations, a single iteration or no iterations.

By way of example, if the specified criteria includes an indication of a maximum quantity of nodes for the final clustered representation, then it may be that the initial clustered representation of the initial clustered representation data 430 is selected to become the final clustered representation as a result of the initial clustered representation already meeting such criteria. More precisely, following generation of the initial clustered representation and before any iterations to generate any further clustered representations are performed, the quantity of nodes in the initial clustered representation may be compared to the maximum quantity of nodes specified by the criteria and it may be determined that the initial clustered representation already meets the specified criteria.

By way of another example, if the specified criteria includes an indication of a maximum degree of loss of information concerning the specified variable that is permitted in the final clustered representation, then it may be that only a single iteration is performed, and that single iteration may or may not include the generation of a next clustered representation. More precisely, following generation of the initial clustered representation a first iteration may be performed to at least the extent that each pair of directly linked nodes having differing values for the specified variable is evaluated to determine the degree of loss of information concerning the specified variable that would result is a next clustered representation were generated by combining the two nodes of that pair. Still more precisely, for each pair of directly linked nodes having differing values for the specified variable, a calculation is performed to determine the amount of information concerning the specified variable that would be presented by a next clustered representation generated by combining the two nodes of that pair, and that amount of information may then be compared to the initial measure to determine the degree of loss of information concerning that variable that would result. It may be that after all of such pairs of nodes that might be combined to generate a next clustered representation have been so evaluated there proves to be no such pair of nodes that can be combined to generate a next clustered representation that would beget a degree of loss of information that would meet the specified criteria. Based on such a result of the evaluations of all of such pairs of nodes, it may be that no next clustered representation is generated during this first iteration, the first iteration may become the only iteration performed, and the initial clustered representation may be selected as the final clustered representation.

Regardless of the number of iterations performed, upon determining that an iteration has resulted in the generation of a clustered representation of the network that meets the criteria for being deemed the final clustered representation, the processor component 550 may store that clustered representation as the final clustered representation data 730 within the storage 560. The processor component 550 may then transmit the final clustered representation data 730 to another computing device, such as the computing device 700, for further analysis and/or to generate a visualization of the represented network therefrom.

In various embodiments, the computing device 700 incorporates one or more of a processor component 750, a storage 760, controls 720, a display 780 and a network interface 790 to couple the viewing device 700 to the network 999. The storage 760 may store one or more of the unclustered network representation data 330, the settings data 735 and a control routine 740. The control routine 740 may incorporate a sequence of instructions operative on the processor component 750 to implement logic to perform various functions.

The computing device 700 may receive the final clustered representation data 730 from the computing device 500, and in some embodiments, may generate a visualization based on the clustered representation data 730 and may present that visualization on the display 780. In such embodiments, the computing device 700 may alter the visualization or request other data providing another representation of the network from the computing device 500 to use in generating a new visualization in response to input received from an operator of the computing device 700 via manual operation of the controls 720. Alternatively or additionally, the computing device 700 may employ the final clustered representation data 730 as an input to further processing of information concerning the network represented in the final clustered representation data 730.

Figure 2:
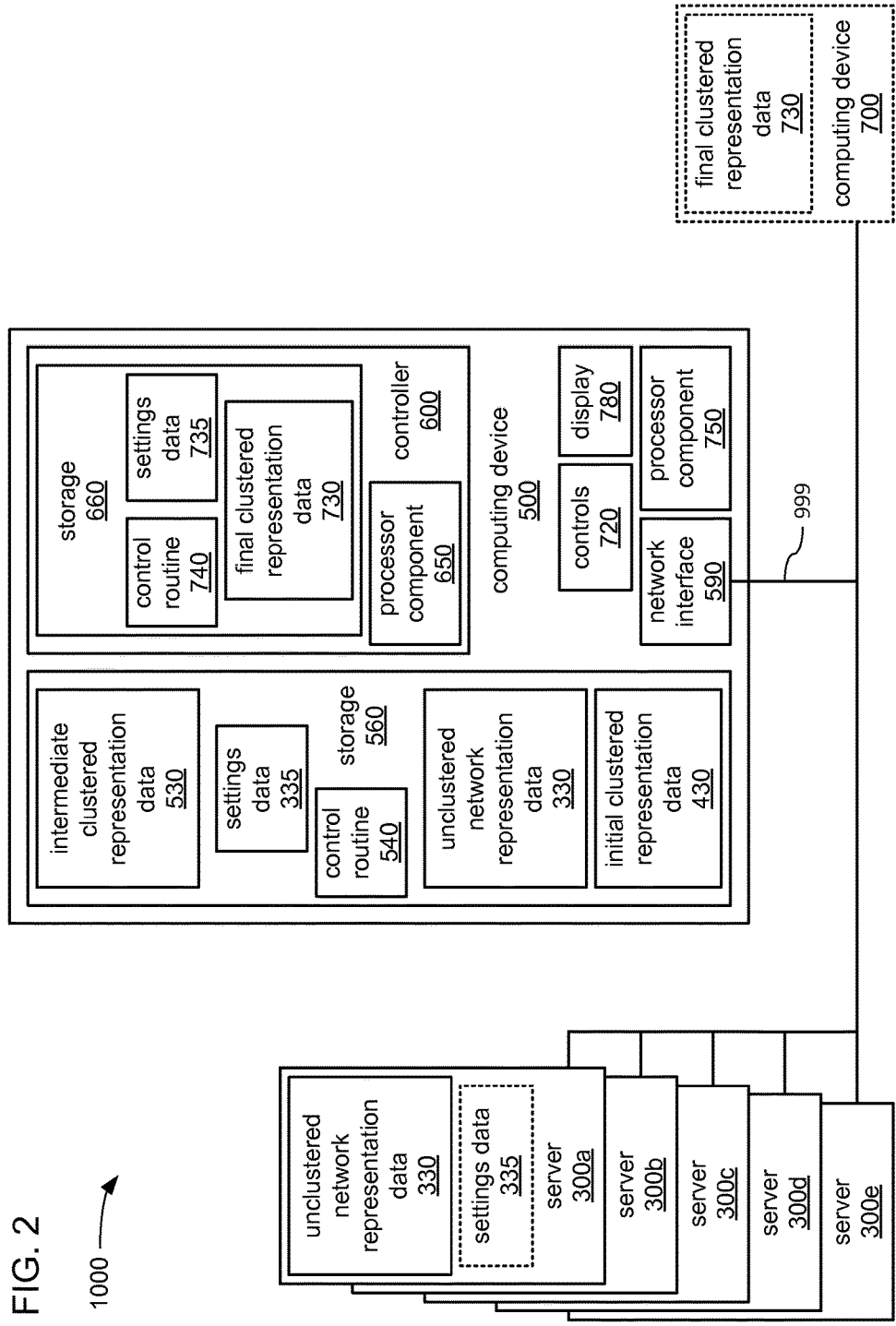
FIG. 2 illustrates an alternate example embodiment of a network analysis system.

FIG. 2 illustrates a block diagram of an alternate example embodiment of the network analysis system 1000 featuring an alternate embodiment of the computing device 500 that subsumes the visual presentation function that may be performed by the embodiment of the computing device 700 of FIG. 1. In FIG. 2, the alternate embodiment of the computing device 500 additionally incorporates one or more of a controller 600, the display 780 and the controls 720. The controller 600 incorporates a processor component 650 and a storage 660. The storage 660 of the controller 600 may store one or more of the settings data 735, the final clustered representation data 730 and the control routine 740. With these additional components, the alternate embodiment of the computing device 500 of FIG. 2 is able to directly generate a visualization based on the final clustered representation data 730 and/or present such a visualization on the display 780 without assistance from another device, unlike the embodiment of the computing device 500 of FIG. 1. Stated differently, the controller 600 of the alternate embodiment of the computing device 500 of FIG. 2 performs functions of the embodiment of the computing device 700 of FIG. 1, with the processor component 650 of the controller 600 executing the control routine 740, instead of the processor component 750 of the embodiment of the computing device 700 of FIG. 1.

Still further, and as additionally depicted with dotted lines in FIG. 2, the final clustered representation data 730 may still be transmitted by the alternate embodiment of the computing device 500 of FIG. 2 to an alternate embodiment of the computing device 700 of FIG. 2 that may not incorporate the graphics capabilities of the embodiment of the computing device 700 of FIG. 1, but may still employ the final clustered representation data 730 as an input to further analysis of the network represented by the final clustered representation data 730. Alternatively or additionally, still another alternate embodiment of the computing device 500 (not shown) may generate and/or present a visualization based on the final clustered representation data 730 on the display 780, but may not include the controller 600 to do so. In such another alternate embodiment of the computing device 500, the control routine 740 may be stored within the storage 560 and may be executed by the processor component 550 to generate and/or present such a visualization.

Figure 3:
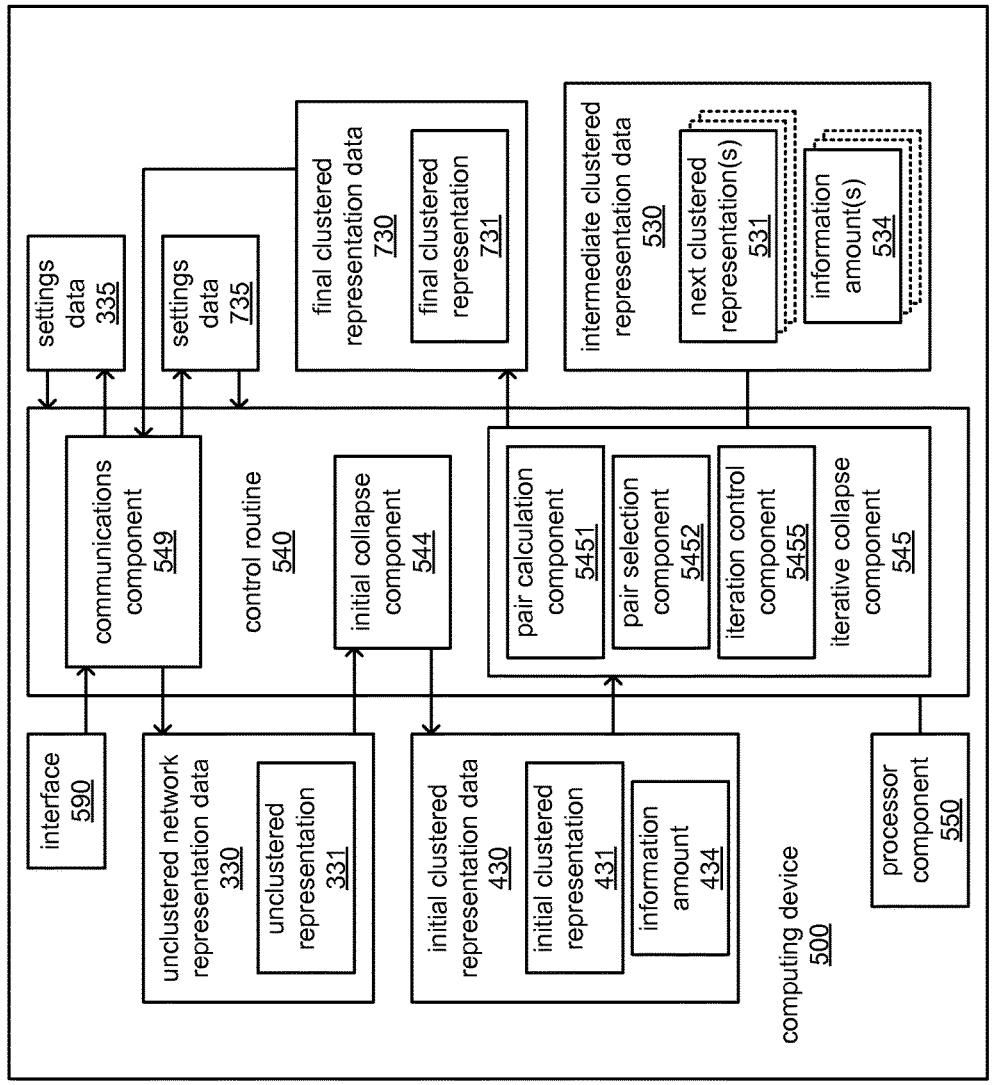
FIGS. 3, 4 and 5 illustrate examples of operating environments for portions of a network analysis system.
Figure 4:
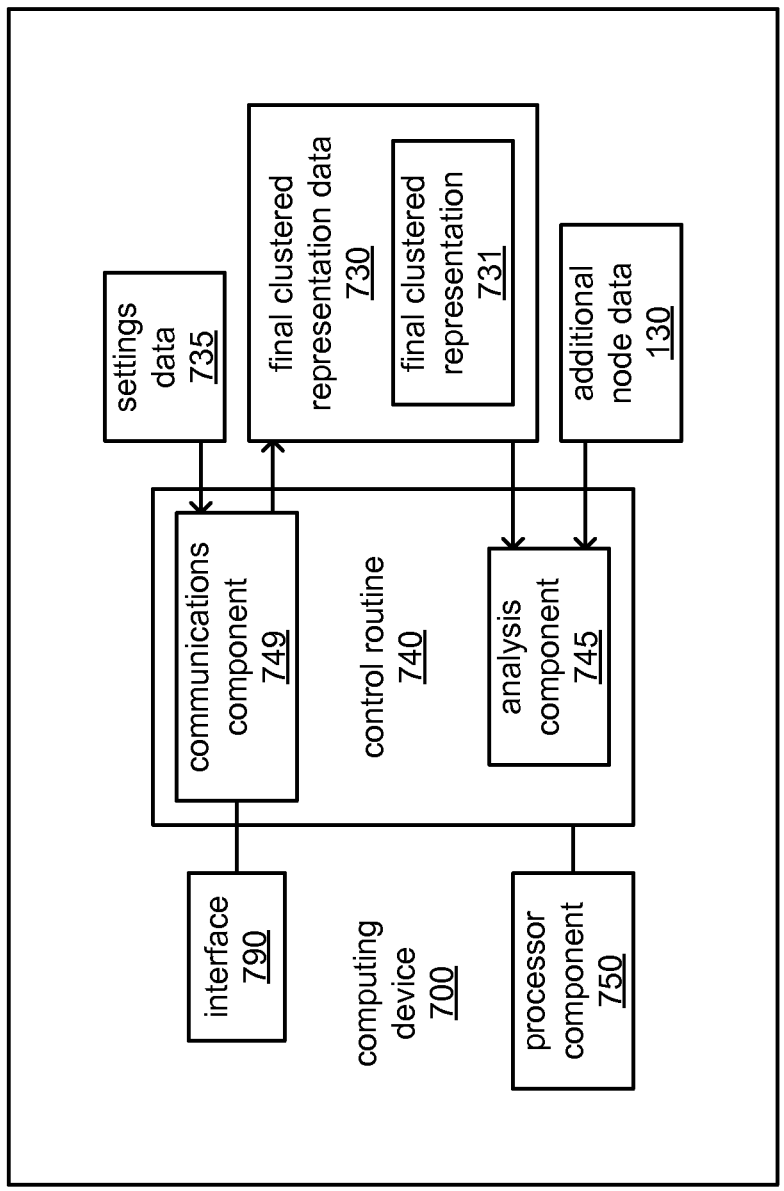
Figure 5:
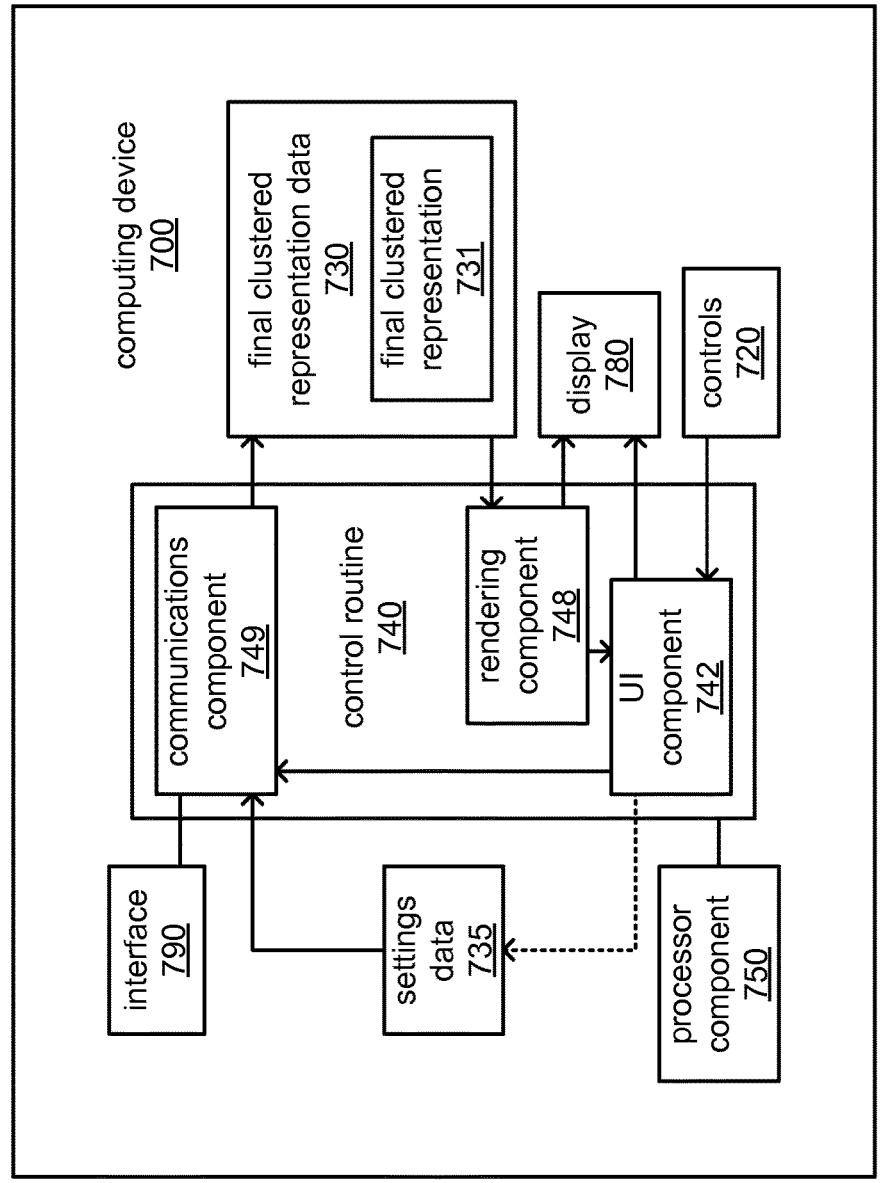

FIGS. 3, 4 and 5 each illustrate a block diagram of a portion of an embodiment of the network analysis system 1000. More specifically, FIG. 3 depicts aspects of the operating environment of one embodiment of the computing device 500 in which the processor component 550, in executing the control routine 540, may generate a final clustered representation of a network within the final clustered representation data 730 from an unclustered representation of that network provided by the unclustered network representation data 330. FIG. 4 depicts aspects of the operating environment the computing device 700 in which the processor component 750, in executing the control routine 740, generates a visualization of the network based on the final clustered representation received from the computing device 500 within the final clustered representation data 730. FIG. 5 depicts aspects of the operating environment the computing device 700 in which the processor component 750, in executing the control routine 740, employs the final clustered representation received from the computing device 500 within the final clustered representation data 730 as an input to further analysis of the represented network.

As recognizable to those skilled in the art, the control routines 540 and 740, including the components of which each is composed, are selected to be operative on whatever type of processor or processors that are selected to implement applicable ones of the processor components 550, 650 or 750. In various embodiments, each of the control routines 540 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 550, 650 or 750. Where one or more device drivers are included, those device drivers may provide support for any of a variety of other components, whether hardware or software components, of corresponding ones of the computing devices 500 or 700, or the controller 600.

In discussing what is depicted in FIGS. 3, 4 and 5, reference is made to various representations of a relatively simple example network 19 depicted in FIGS. 6, 7 and 8a-d. As depicted, the network 19 is made up of nodes 10a through 10k that are linked directly and/or indirectly via various point-to-point links 9. It should be noted that this relatively simple example network 19 is presented herein for purposes of illustration to facilitate understanding. It is to be understood that such use of such a relatively simple network should not be construed as limiting what is disclosed and claimed herein to use with such simple networks. Indeed, it is envisioned that what is disclosed and claimed herein may be used with relatively large networks incorporating a great many nodes that may be linked with a great many point-to-point links providing a complex combination of direct and indirect linkages among the nodes.

Referring to all three of FIGS. 3, 4 and 5, the control routines 540 and/or 740 may include the communications component 549 and/or 749 executable by the processor component 550 and/or 750 to operate the network interface 590 and/or 790, respectively, to exchange communications via the network 999 as has been described. Among the communications may be those conveying the unclustered network representation data 330, the settings data 335, the final clustered representation data 730 and/or the settings data 735 among the computing devices 300a-e, 500 and/or 700 via the network 999. As will be recognized by those skilled in the art, the communications components 549 and 749 are selected to be operable with whatever type of interface technology is selected to implement the network interfaces 590 and 790, respectively.

Turning more specifically to FIG. 3, as previously discussed, the unclustered network representation data 330 may be received by the computing device 500 (e.g., through operation of the network interface 590 by the communications component 549) from one or more of the servers 300a-e or may be generated within the computing device 500 from other data received from one or more of the servers 300a-e. Regardless of how the unclustered network representation data 330 is made available to the computing device 500, the unclustered network representation data 330 may include an unclustered representation 331 of the network 19 in which none of the nodes have been combined such that the unclustered representation 331 may more accurately represent the network 19 as it actually existed, at least at one time.

Figure 6:
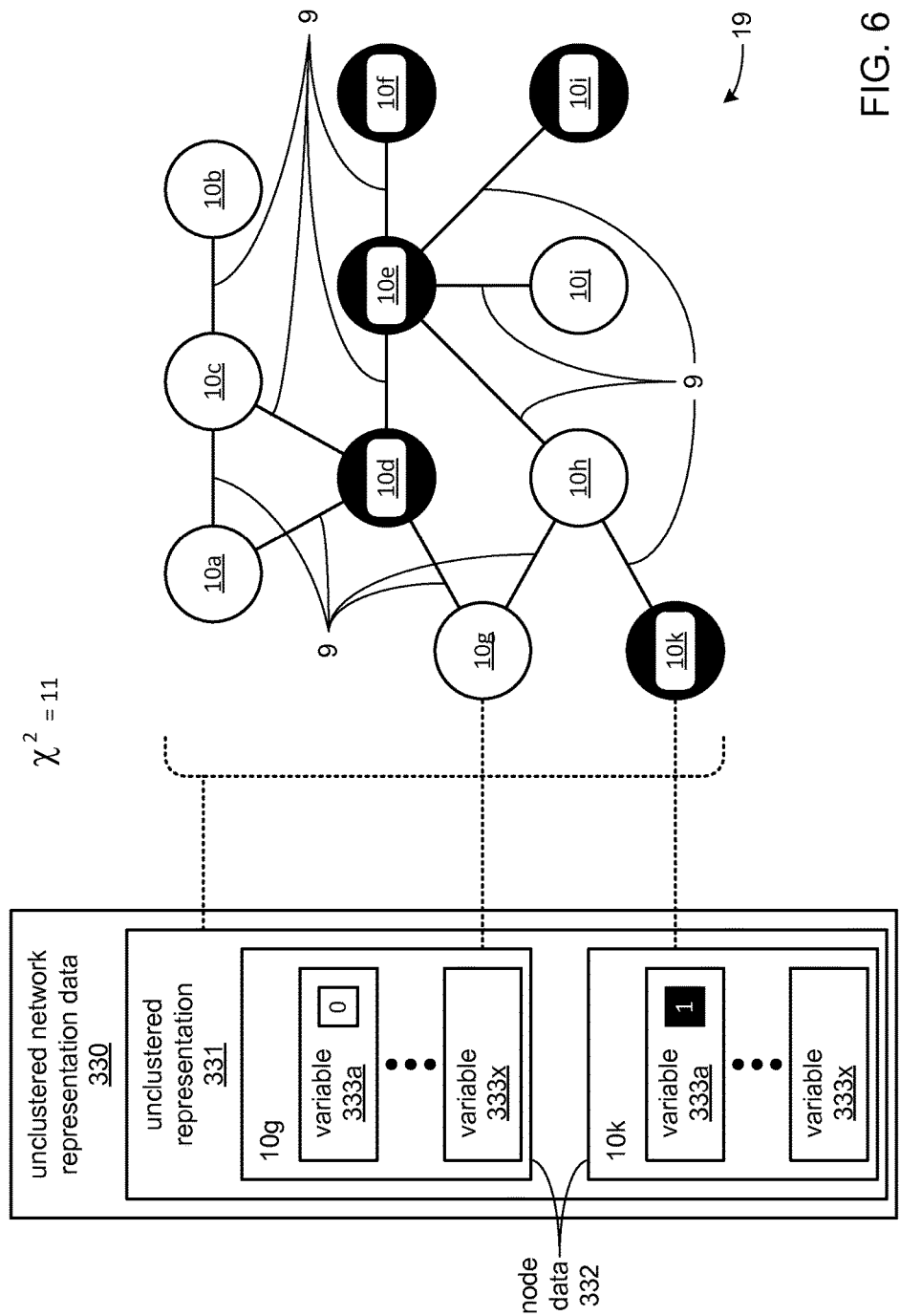
FIG. 6 illustrates an example embodiment of an unclustered representation of an example network.

FIG. 6 depicts the example network 19 as it may be represented in its actual unclustered form by the unclustered representation 331 within the unclustered network representation data 330. As depicted, the unclustered representation 331 of the example network 19 may be made up of pieces of node data 332 that each represent only a single one of the nodes 10a-k, of which examples of node data 332 for the nodes 10g and 10k are specifically depicted. In other words, and as suggested by the term "unclustered", none of the nodes 10a-k are made up of a combination of two or more nodes. As previously discussed, there may be one or more variables associated with each node of a network. Thus, the specifically depicted example pieces of node data 332 for each of the nodes 10g and 10k may include indications of value(s) for variables 333a through 333x associated with corresponding ones of those nodes. As previously discussed, each of the variables 333a through 333x may be capable of having two or more discrete values at each node 10, or may be capable of having any value at each node 10 that falls within a continuous range of values. As depicted in FIG. 6 for the example network 19, the variable 333a may be a binary variable in which the possible values for the variable 333a at each of the nodes 10a-k may be 0 (corresponding to a light shading for some of the nodes 10a-k) or 1 (corresponding to a dark shading of others of the nodes 10a-k). As more specifically depicted, the value of the variable 333a at the node 10g is 0, while the value of the same variable 333a at the node 10k is 1.

Returning to FIG. 3, the communications component 549 may further operate the network interface 590 to receive the settings data 335 from one of the servers 300a-e and/or to receive the settings data 735 from the computing device 700. As previously discussed, the settings data 335 or 735 may indicate what variable is specified for use as the basis for collapsing the unclustered representation 311 of a network to generate a final clustered representation 731 of that network within the final clustered representation data 730. For the sake of further discussion of the example network 19, it is assumed that the variable 333a has been indicated in the settings data 335 or 735, or by another mechanism, as the specified variable on which the collapsing of the unclustered representation 331 to generate the final clustered representation 731 is to be based. As also previously discussed, the settings data 335 or 735 may also indicate what criteria is specified for use in determining which clustered representation to be generated may be selected as the final clustered representation 731.

The control routine 540 may include an initial collapse component 544 to generate an initial clustered representation 431 within the initial clustered representation data 430 from the network represented by the unclustered representation 331 within the unclustered network representation data 330. The initial collapse component 544 may examine the value for the specified variable 333a at each node 10 described in the unclustered representation 331, and wherever there are two or more directly linked nodes 10 that share the same value for the specified variable 333a, the initial collapse component 544 may combine those nodes 10 into a single node 10 as part of generating the initial clustered representation 431.

Figure 7:
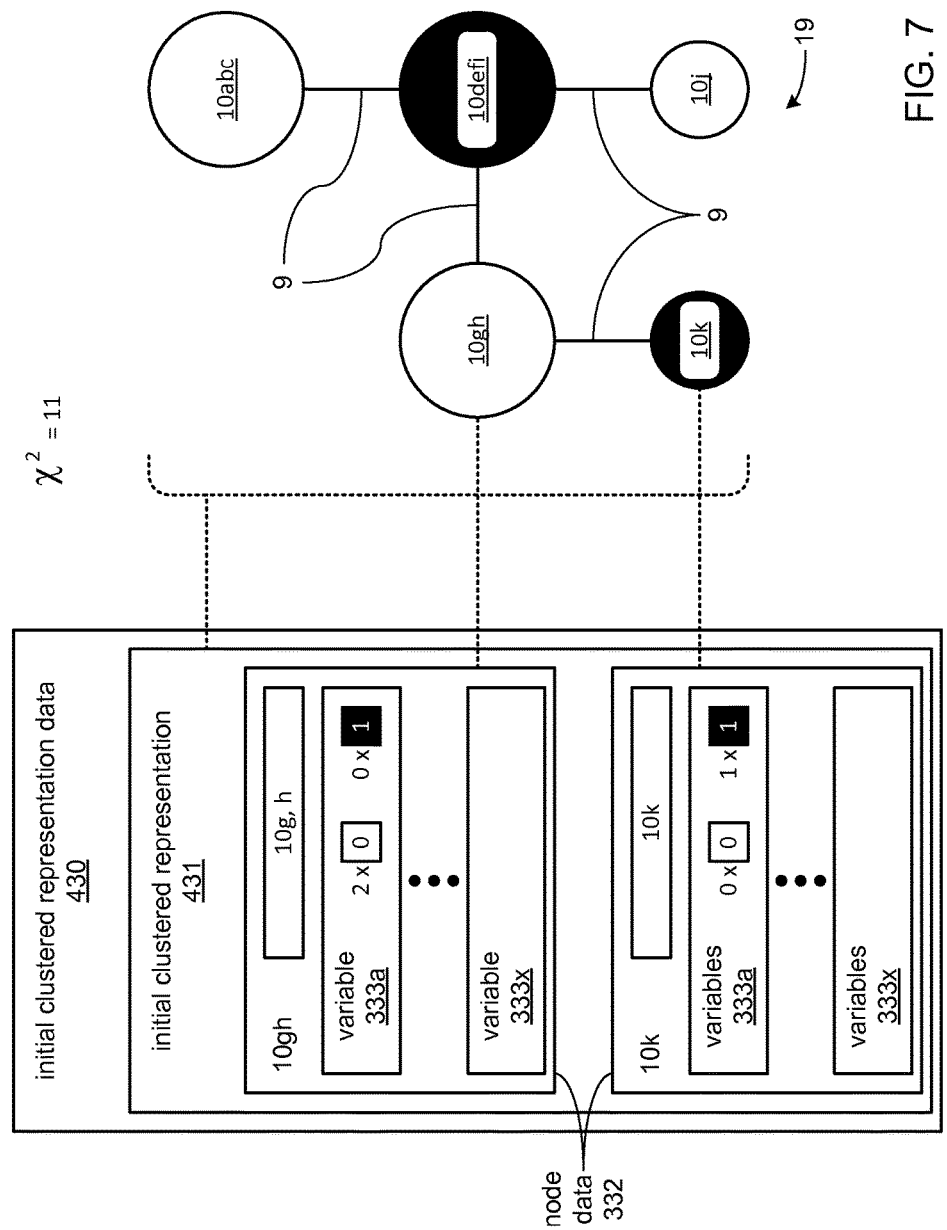
FIG. 7 illustrates an example embodiment of an initial clustered representation of the example network of FIG. 6.

FIG. 7 depicts the example network 19 as it may be represented by the initial clustered representation 431 within the initial clustered representation data 430. For the sake of this discussion using the example network 19, it is to be assumed that the variable 333a is specified in the settings data 335 or 735 received via the network interface 590 by the communications component 549 (or specified by another mechanism) as the variable on which the collapsing of representations of the network 19 is to be based. In comparing the representations 331 and 431 of the network 19 of FIGS. 6 and 7, respectively, it can be seen that some of the individual nodes 10a-k of the unclustered representation 331 that were directly linked (e.g., linked by only one of the point-to-point links 9) and that shared the same value of 0 or 1 for the specified variable 333a were combined by the initial collapse component 544 as part of generating the initial clustered representation 431. Specifically, the directly linked nodes 10a, 10b and 10c of the unclustered representation 331 that all share the value of 0 for the specified variable 333a were combined to form the node 10abc having the value 0 for the specified variable 333a in the initial clustered representation 431. Similarly, the directly linked nodes 10g and 10h of the unclustered representation 331 that both share the value of 0 for the specified variable 333a were combined to form the node 10gh having the value 0 for the specified variable 333a in the initial clustered representation 431. Also, the directly linked nodes 10d, 10e, 10f and 10i of the unclustered representation 331 that all share the value of 1 for the specified variable 333a were combined to form the node 10defi having the value 1 for the specified variable 333a in the initial clustered representation 431.

Although the node 10g is linked in the unclustered representation 331 to the same node 10d as both of the nodes 10a and 10c with which the node 10g shares the same value of 0 for the specified variable 333a, such a linkage through the node 10d is not a direct linkage between the node 10g and either of the nodes 10a or 10c. Thus, there is no node formed by the initial collapse component 544 from a combination of the nodes 10a-c and 10g-h in the initial clustered representation 431. Similarly, although the node 10k is linked in the unclustered representation 331 to the same node 10h as the node 10e with which the node 10k shares the same value of 1 for the specified variable 333a, such a linkage through the node 10h is not a direct linkage. Thus, there is no node formed by the initial collapse component 544 from a combination of the nodes 10d-f, 10i and 10k in the initial clustered representation 431.

In combining two or more of the nodes 10 of the unclustered representation 331 to form a single node 10 within the initial clustered representation 431, multiple ones of the node data 332 in the unclustered network representation data 330 that correspond to the two or more combined nodes 10 may be combined by the initial collapse component 544 to form a single one of the node data 332 in the initial clustered representation data 430. In so doing, that single one of the node data 332 in the initial clustered representation 431 may include indications of how many of and/or which ones of the nodes 10 in the unclustered representation 331 were combined to form the corresponding single node 10 had each of the possible values for the specified variable 333a. Thus, as depicted, for the node 10gh within the initial clustered representation 431 its corresponding one of the node data 332 may include an indication that the node 10gh is made up of the two nodes 10g and 10h of the unclustered representation 331 that both had the value of 0 for the specified variable 333a such that the node 10gh includes two instances of the value of 0 for the specified variable 333a. In contrast, as also depicted, the one of the node data 332 that corresponds to the uncombined node 10k within the initial clustered representation 431 may include an indication that the node 10k is unchanged from the unclustered representation 331 and still includes only a single instance of the value of 1 for the specified variable 333a.

After generating the initial clustered representation 431, the initial collapse component 544 may also calculate the amount of information concerning the specified variable 333a that is provided by the in the initial clustered representation 431 as an initial measure of the amount of that information. Again, since the initial clustered representation 431 is generated by the initial collapse component 544 by combining only directly linked nodes 10 of the unclustered network representation 331 that have the same value for the specified variable 333a, and not by combining any nodes 10 with dissimilar values for the specified variable 333a, there is be no loss of information concerning the specified variable 333a in generating the initial clustered representation 431 from the unclustered representation 331. Thus, the measure of the amount of information concerning the specified variable 333a provided by either of the unclustered representation 331 or the initial clustered representation 431 will be identical.

As previously discussed, any of a variety of statistical measures may be used in arriving at this initial measure, including and not limited to, a Pearson Chi-squared ($\chi^2$) statistic, a F-test, a p-value or a logworth of the p-value. As familiar to those skilled in the art, the specific statistical measure used may be based on one or more characteristics of the variety of values that a particular variable may have. In the example network 19, as previously stated, the specified variable 333a is a binary variable such that the variety of values is limited to two. In situations where the specified variable is a binary variable, as in this example network 19, the Pearson Chi-squared ($\chi^2$) statistic may be deemed an appropriate choice. Thus, as depicted, the initial measure of information concerning the specified variable 333a provided by the initial clustered representation 431 may be calculated using the Pearson Chi-squared ($\chi^2$) statistic. As another example, if the specified variable 333a were, instead, a variable that could have any value within a continuous range of values, then the F-test may be deemed an appropriate choice. Still other types of statistical measure for these and/or still other types of variables may occur to those skilled in the art.

Returning to FIG. 3, the control routine 540 may include an iterative collapse component 545 to generate a next clustered representation 531 within the intermediate clustered representation data during each of one or more iterations starting from the initial clustered representation 431 within the initial clustered representation data 430. As depicted, the iterative collapse component 545 may incorporate one or more of a pair calculation component 5451 to calculate amounts of information concerning the specified variable 333a for each pair of nodes 10 that may be combined during an iteration, a pair selection component 5452 to select one of the pairs of the nodes 10 to be combined to generate a next clustered representation 531 during an iteration, and an iteration control component 5455 to control the number of iterations. During execution of the iterative collapse component 545, the processor component 550 may execute one or more of the components 5451, 5452 and 5455 of the iterative collapse component 545.

As previously discussed, the specified criteria may be such that it may be possible to determine whether the specified criteria have already been met by the generation of the initial clustered representation 431, even before a single iteration to evaluate pairs of the nodes 10 and/or to generate a next clustered representation 531. By way of example, where the specified criteria includes a specification of a maximum quantity of the nodes 10 within the final clustered representation 731, the iteration control component 5455 may evaluate the initial clustered representation 431 to determine whether the initial clustered representation 431 already includes few enough of the nodes 10 to meet that specified criteria. If the initial clustered representation 431 already includes few enough of the nodes 10 as to be fewer than or equal to that specified maximum quantity of the nodes 10, then the iteration control component 5455 may determine that the initial clustered representation 431 is to be selected as the final clustered representation 731, and that no iterations to evaluate and/or generate a next clustered representation 531 need be performed. However, if the specified criteria additionally includes one or more other criteria that cannot be tested using only the initial clustered representation 431, or if the initial clustered representation 431 is evaluated and found to not meet the specified criteria, then the iteration control component 5455 may determine that at least one iteration is to be performed.

In situations where at least a first iteration is to be performed, the initial clustered representation 431 may be used as the starting point. Thus, for the first iteration, the pair calculation component 5451 may evaluate each pair of the nodes 10 of the initial clustered representation 431 that are directly linked and that have dissimilar values for the specified variable 333a. More specifically, for each such pair of the nodes 10 of the initial clustered representation 431, the calculation component 5451 may calculate the amount of information concerning the specified variable 333a that would be provided by a next clustered representation 531 generated by combining those two nodes 10 of that pair to form that next clustered representation 531. Following the calculation of such an amount of information associated with each such pair of the nodes 10 of the initial clustered representation 431 by the pair calculation component 5451, the pair selection component 5452 may compare that calculated amount of information associated with each such pair of the nodes 10 to the initial measure of information earlier calculated for the initial clustered representation 431. Through making such comparisons, the pair selection component 5452 may determine which one of such pairs of the nodes 10, if combined to form a next clustered representation 531, results in the smallest degree of loss of information concerning the specified variable 333a.

Figure 8A:
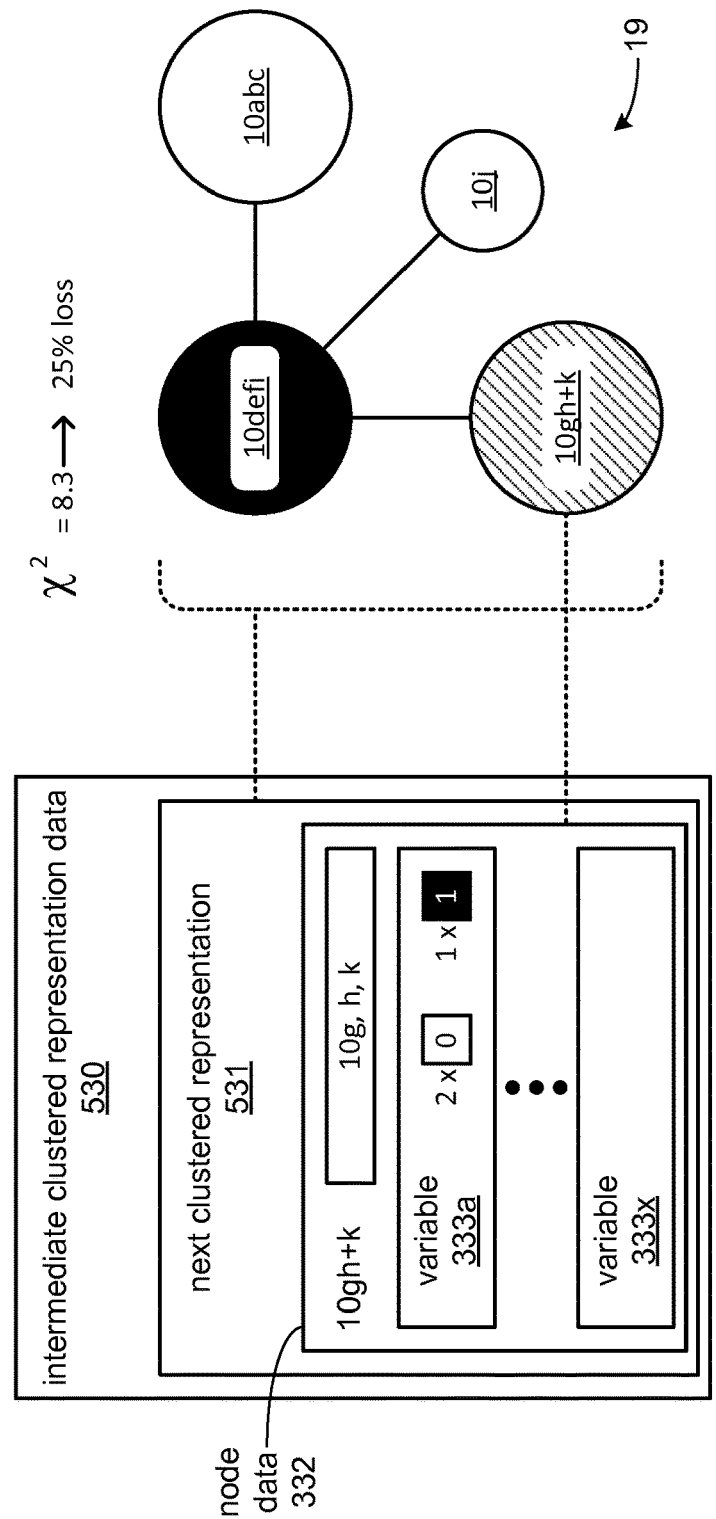
FIGS. 8A, 8B, 8C and 8D, together, illustrate an example embodiment of a selection of candidates for a next clustered representation of the example network of FIG. 6.
Figure 8B:
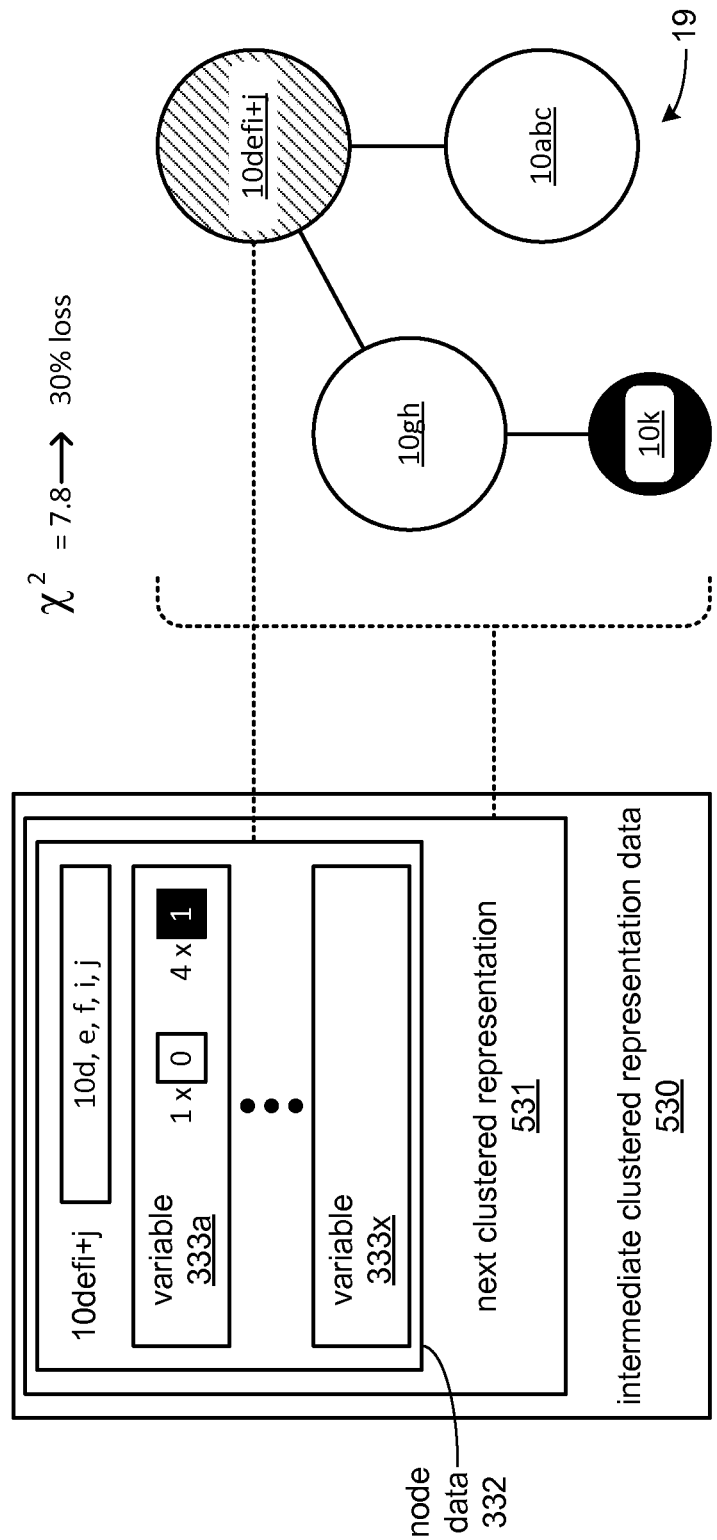
Figure 8C:
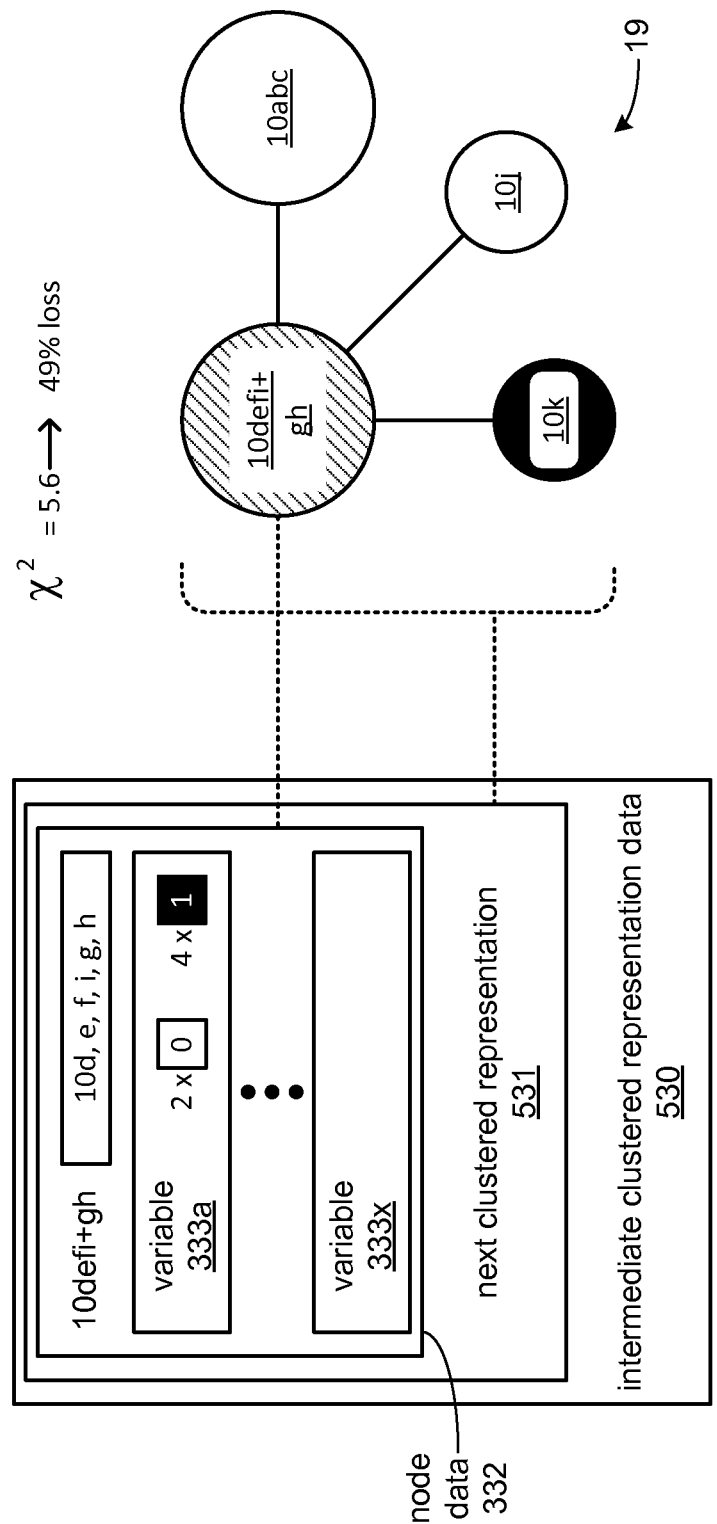
Figure 8D:
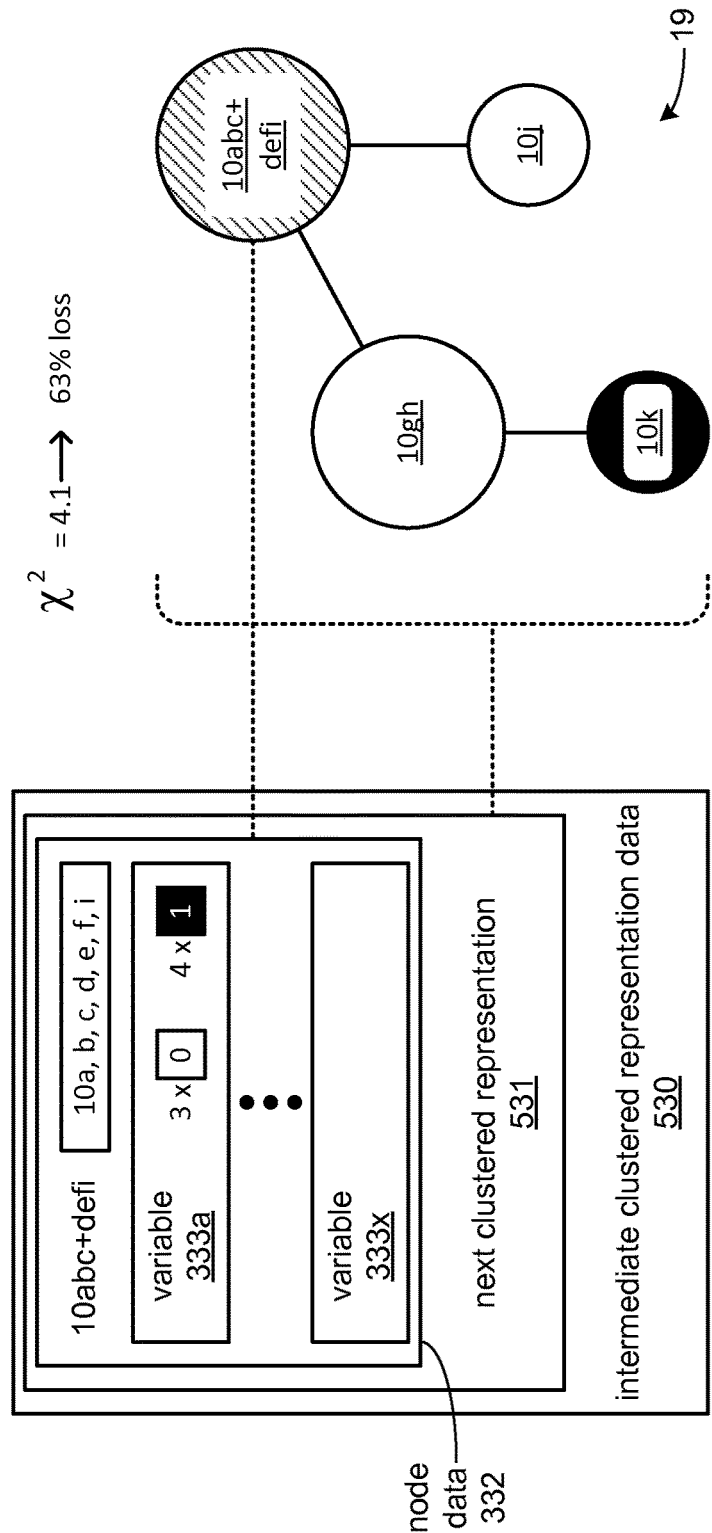

FIGS. 8A to 8D, together, depict an example range of candidate combinations of pairs of nodes 10 in the initial clustered representation 431 that may be evaluated by the pair calculation component 5451, the associated versions of next clustered representations 531 that would be generated as a result of effecting the combination of each of those evaluated pairs of nodes 10, and the amount of information concerning the specified variable 333a that each such version of clustered representation 531 would provide if generated. More precisely, FIG. 8A depicts the evaluation of the results of combining the nodes 10gh and 10k of initial clustered representation 431, FIG. 8B depicts the evaluation of the results of combining the nodes 10defi and 10j of the initial clustered representation 431, FIG. 8C depicts the evaluation of the results of combining the nodes 10defi and 10gh of the initial clustered representation 431, and FIG. 8D depicts the evaluation of the results of combining the nodes 10abc and 10defi of the initial clustered representation 431.

As depicted, each of these four evaluated combinations of two nodes 10 of the initial clustered representation 431, if selected as the approach to generating a next clustered representation 531 from the initial clustered representation 431, would collapse the representation of the example network 19 by one node 10 (specifically, from a quantity of five of the nodes 10 to a quantity of four). As also depicted each of these four evaluated combinations of two of the nodes 10 of the initial clustered representation 431 necessarily results in some degree of loss of information concerning the specified variable 333a due to combining a pair of the nodes 10 that have dissimilar values for the specified variable 333a. More specifically, each of these four evaluated combinations reduces the clarity of the delineation provided in the initial clustered representation 431 between ones of the nodes 10 that have one of the two values of the specified variable 333a and ones of the nodes 10 that have the other of the two values of the specified variable 333a. Such reduction in the clarity of that delineation is depicted in each of FIGS. 8A to 8D by the cross-hatched shading of the one node 10 that results from each of the four evaluated combinations to reflect the mixing of dissimilar values of the specified variable 333a therein.

As further depicted, the pair calculation component 5451 may employ the same Pearson Chi-squared ($\chi^2$) statistic to calculate the amount of information concerning the specified variable 333a that would be provided by each of the versions of a next clustered representation 531 that would be generated as a result of effecting each of these four evaluated combinations of the nodes 10 of the initial clustered representation 431. As still further depicted, the pair selection component 5452 may then compare each of these calculated amounts of information to the initial measure of information associated with the initial clustered representation 431 to determine which of these four evaluated combinations is associated with the smallest degree of loss of information. As depicted in FIG. 8A, effecting the combination of the nodes 10gh and 10k of the initial clustered representation 431 to generate a version of a next clustered representation 531 that would include the resulting node 10gh+k would beget a degree of loss of information concerning the specified variable 333a of 25%. In comparing FIG. 8A to each of FIGS. 8B to 8D, it becomes apparent that a degree of loss of 25% is the smallest degree of loss possible from the combining of any two nodes 10 of the initial clustered representation 431 to collapse the representation of the example network 19 to reduce the quantity of nodes 10 by one. Thus, the pair selection component 5452 may select the nodes 10gh and 10k as the best available pair of the nodes 10 of the initial clustered representation 431 to be combined to generate a next clustered representation 531 directly from the initial clustered representation 431.

In addition to depicting each of the versions of a next clustered representation 531 that would result from effecting each of the four evaluated combinations of the nodes 10 of the initial representation 431, FIGS. 8A to 8D also depict corresponding combinations of ones of the node data 332 that would also result. More specifically, FIG. 8A depicts the resulting combination of the ones of the node data 332 that correspond to the nodes 10gh and 10k of the initial representation 431 to form a one of the node data 332 that corresponds to the resulting node 10gh+k. As with the combining of ones of the nodes 10 of the unclustered representation 331 to form the initial clustered representation 431, a one of the node data 332 that is so formed may include an indication of the quantity of the nodes 10 of the unclustered representation 331 and/or which ones of the nodes 10 of the unclustered representation 331 that were combined to form the one node 10 to which that one of the node data 332 corresponds. Also as with the combining of ones of the nodes 10 of the unclustered representation 331 to form the initial clustered representation 431, a one of the node data 332 that is so formed may include indications of the quantities of instances of each of the values 0 and 1 from all of the nodes 10 of the unclustered representation 331 that were combined to form the one node 10 to which that one of the node data 332 corresponds.

As previously discussed, the specified criteria may be such that it may be possible to determine whether the specified criteria have already been met by the generation of the initial clustered representation 431 following the evaluation of each of the four evaluated pairs of the nodes 10 of the initial clustered representation 431, but before a next clustered representation 531 is generated during the first iteration. By way of example, where the specified criteria includes a specification of a maximum degree of loss of information concerning the specified variable 333a that may be associated with the final clustered representation 731, the 25% degree of loss associated with the pair of the nodes 10gh and 10k selected by the pair selection component 5452 during the first iteration may be evaluated by the iteration control component 5455 to determine whether it meets the specified criteria. If this 25% degree of loss of information concerning the specified variable 333a exceeds the maximum degree of loss of information specified in the specified criteria, then it may be deemed impossible to create a clustered representation of the network 19 that is any more collapsed than the initial clustered representation 431 without exceeding that specified maximum degree of loss of information concerning the specified variable 333a. In response, the iteration control component 5455 may select the initial clustered representation 431 to be the final clustered representation 731 and the first iteration may become the only iteration to be performed. Further, it may be that generation of a next clustered representation 531 during the first (and only) iteration may never be performed since such a next clustered representation 531 would not meet the specified criterion, and therefore, would never be selected as the final clustered representation 731.

However, if the 25% degree of loss of information concerning the specified variable 333a does not exceed a specified maximum degree of loss of information that may be included in the specified criteria, then the iteration control component 5455 may allow the combination of the nodes 10gh and 10k depicted in FIG. 8A to be effected by the iterative collapse component 545 to generate the version of a next clustered representation 531 also depicted in FIG. 8A. That next clustered representation 531 may then serve as the starting point for a second iteration in which each directly linked pair of the nodes 10 of that next clustered representation 531 may be evaluated to determine the degree of loss of information that would result from effecting the combination of each of those pairs of nodes 10, and one of those pairs of nodes 10 of that next clustered representation 531 may be selected as begetting the smallest degree of loss of information. Depending on the specified criteria, such a second iteration may be followed by a third iteration, and so on. Alternatively or additionally, the next clustered representation 531 depicted in FIG. 8A may be evaluated to determine if it meets the specified criteria for being selected as the final clustered representation 731, and such an evaluation may result in the second iteration being the last iteration. By way of example, the specified criteria may specify that the final clustered representation 731 is to include exactly four or no more than four nodes 10 such that the iteration control component 5455 may select the next clustered representation depicted in FIG. 8A to become the final clustered representation 731.

Returning to FIG. 3, regardless of how many iterations are performed, and regardless of whether a next clustered representation 531 or the initial clustered representation 431 is selected by the iteration control component 5455 to become the final clustered representation 731, the communications component 549 may operate the network interface 590 to convey the final clustered representation 731 within the final clustered representation data 730 to the computing device 700. As previously discussed, the computing device 700 may generate a visualization of the final clustered representation 731 of the example network 19 from the final clustered representation data 730 and may present that visualization on the display 780. Alternatively or additionally, the computing device 700 may use the final clustered representation 731 of the example network 19 as an input to the performance of a further analysis of the example network 19.

Turning to FIG. 4, the communications component 749 may operate the network interface 790 to receive the final clustered representation data 730 from the computing device 500 via the network 999. As depicted, the control routine 740 may include an analysis component 745 to employ the final clustered representation 731 within the final clustered representation data 730 as an input to a further analysis of the example network 19. Such an analysis may entail combining the final clustered representation 731 with additional node data 130 that may include indications of further information concerning one or more of the nodes 10 of the example network 19 and/or further information concerning an interaction, association or correlation between two or more of the nodes 10 of the example 19.

Figure 9:
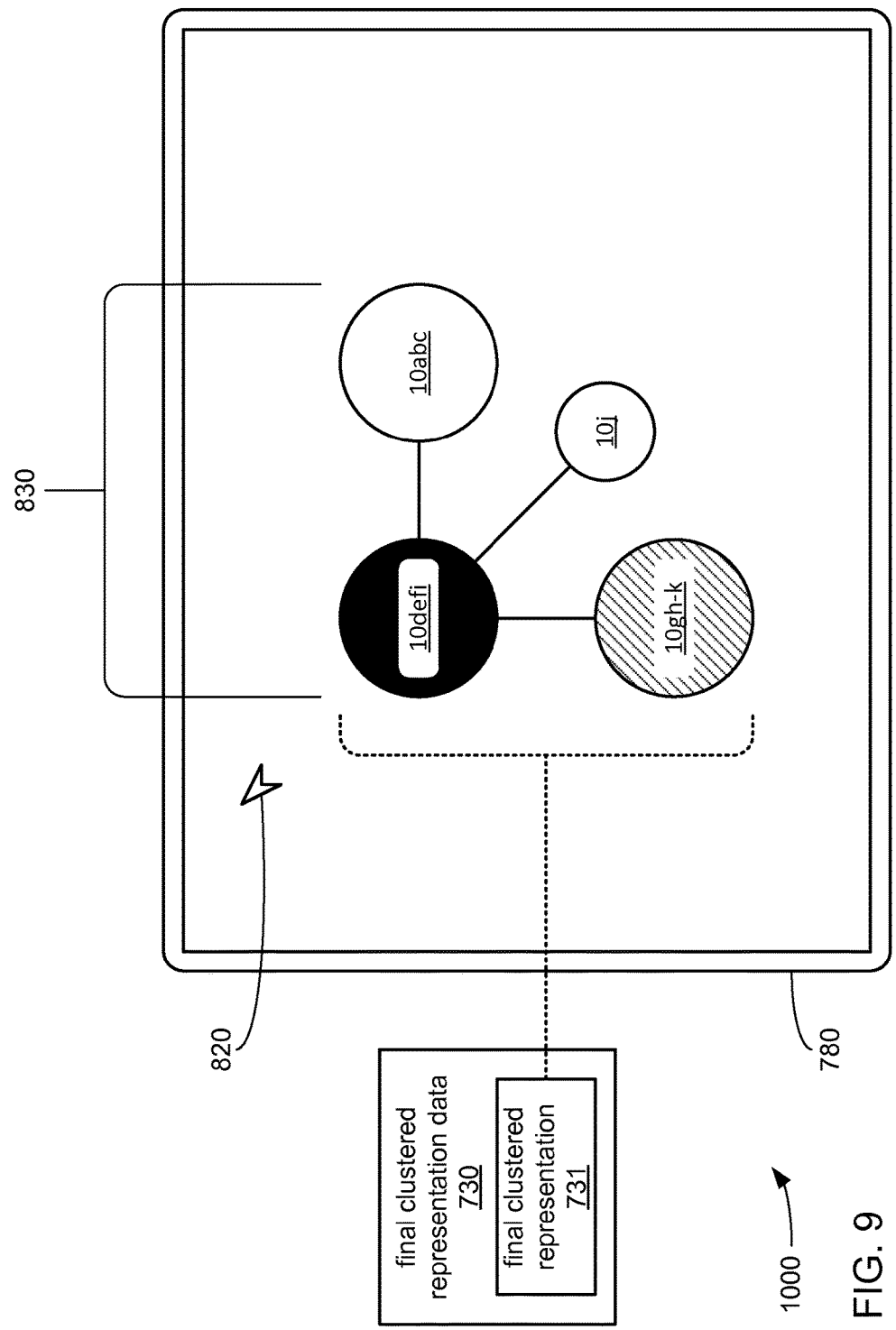
FIG. 9 illustrates an example embodiment of a visualization generated to depict a final clustered representation of the example network of FIG. 6.

Turning to FIG. 5, again, the communications component 749 may operate the network interface 790 to receive the final clustered representation data 730 from the computing device 500 via the network 999. However, as depicted, the control routine 740 may alternatively or additionally include a rendering component 748 to generate a visualization of the example network 19 based on the final clustered representation 731 within the final clustered representation data 730. FIG. 9 illustrates an example of the presentation of a visualization 830 on the display 780.

Returning to FIG. 5, the control routine 740 may additionally include a user interface (UI) component 742 to operate one or both of the display 780 and the controls 720 to provide a user interface to an operator of the computing device 700. More specifically, in some embodiments, the UI component 742 may enable an operator of the computing device 700 to manually enter an indication of what the specified variable (e.g., the variable 333*a*) and/or the specified criteria may be. Upon receipt of such an indication from the operator, the UI component 742 may generate and/or edit the settings data 735 to indicate the specified variable and/or the specified criteria as so provided by the operator. The communications component 749 may then operate the network interface 790 to transmit the settings data 735 to the computing device 500.

It should be noted that the settings data 735 may include one or more settings that may arise from sources other than input provided by an operator of the computing device 700. By way of example, an indication of an exact quantity of nodes 10 or a maximum quantity of nodes 10 to be included in the final clustered representation 731 may be automatically included among the specified criteria conveyed in the settings data 735 by the UI component 742. Such an exact or maximum quantity of nodes 10 may be derived by the UI component based on the pixel resolution of the display 780 and/or the pixel resolution within a window that may have been opened by an operator of the computing device 700 for presenting the visualization 830. More precisely, where a greater pixel resolution is available for use in presenting the visualization 830, the UI component 742 may specify a larger exact or maximum quantity of nodes 10, and where a lesser pixel resolution is available for such use, the UI component 742 may specify a smaller exact or maximum quantity of nodes 10 to thereby size the visualization 830 for the available pixel resolution.

Returning to FIG. 9, the provision of a user interface by the UI component 742 may entail the presentation of one or more graphical user interface (GUI) elements on the display 780, such as the depicted pointer 820, alongside the visualization 830. The UI component 742 may cooperate with the presentation component 748 to enable an operator of the computing device 700 to use such GUI elements to interact with elements of the visualization 830 to convey a command to the computing device 700 to change an aspect of the visualization 830 and/or to request a different, but related visualization. By way of example, one or more of the nodes 10 depicted in the visualization 830 may be made selectable with the pointer 820 to enable an alternate visualization to be requested that may include only the selected node(s) and/or the nodes of the unclustered representation 331 that make up the selected node(s). The communications component 749 may relay such a request back to the computing device 500 to cause the computing device 500 to repeat the aforedescribed process to generate a new final clustered representation 731 that includes only requested subset of nodes. Upon being provided with a new final clustered representation data 730 that conveys such a new final clustered representation 731, the rendering component 748 may then generate and display a new visualization 830 based on that new final clustered representation 731.

By way of another example, a menu or other form of GUI element (not shown) may be provided by which a request may be made to present a visualization of one or more of the clustered representations that may have been generated during the process of deriving the final clustered representation (e.g., the initial clustered representation 431 or a next clustered representation 531 that may have been generated during an iteration). Such a requests may be relayed by the UI component 742 to the communications component 749, which may operate the network interface 790 to transmit such a request back to the computing device 500 to be acted upon. In response, the computing device 500 may transmit the initial clustered representation 431 within the initial clustered representation data 430, or may transmit a next clustered representation 531 within the intermediate clustered representation data 530 to the computing device 700. The rendering component may then generate and present a new visualization 830 on the display therefrom.

Figure 10A:
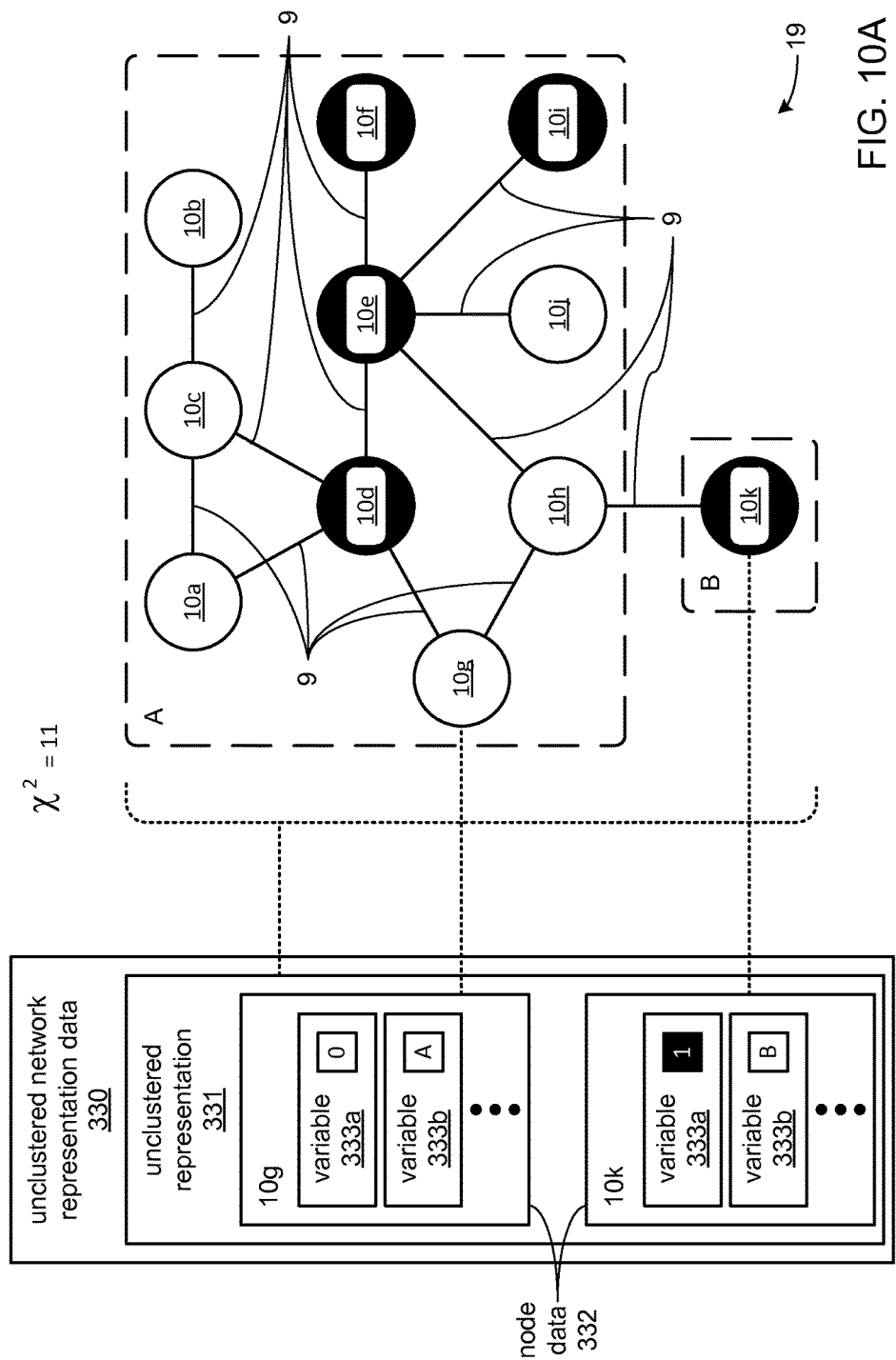
FIG. 10A illustrates an example embodiment of an unclustered representation of an alternate example network.
Figure 10B:
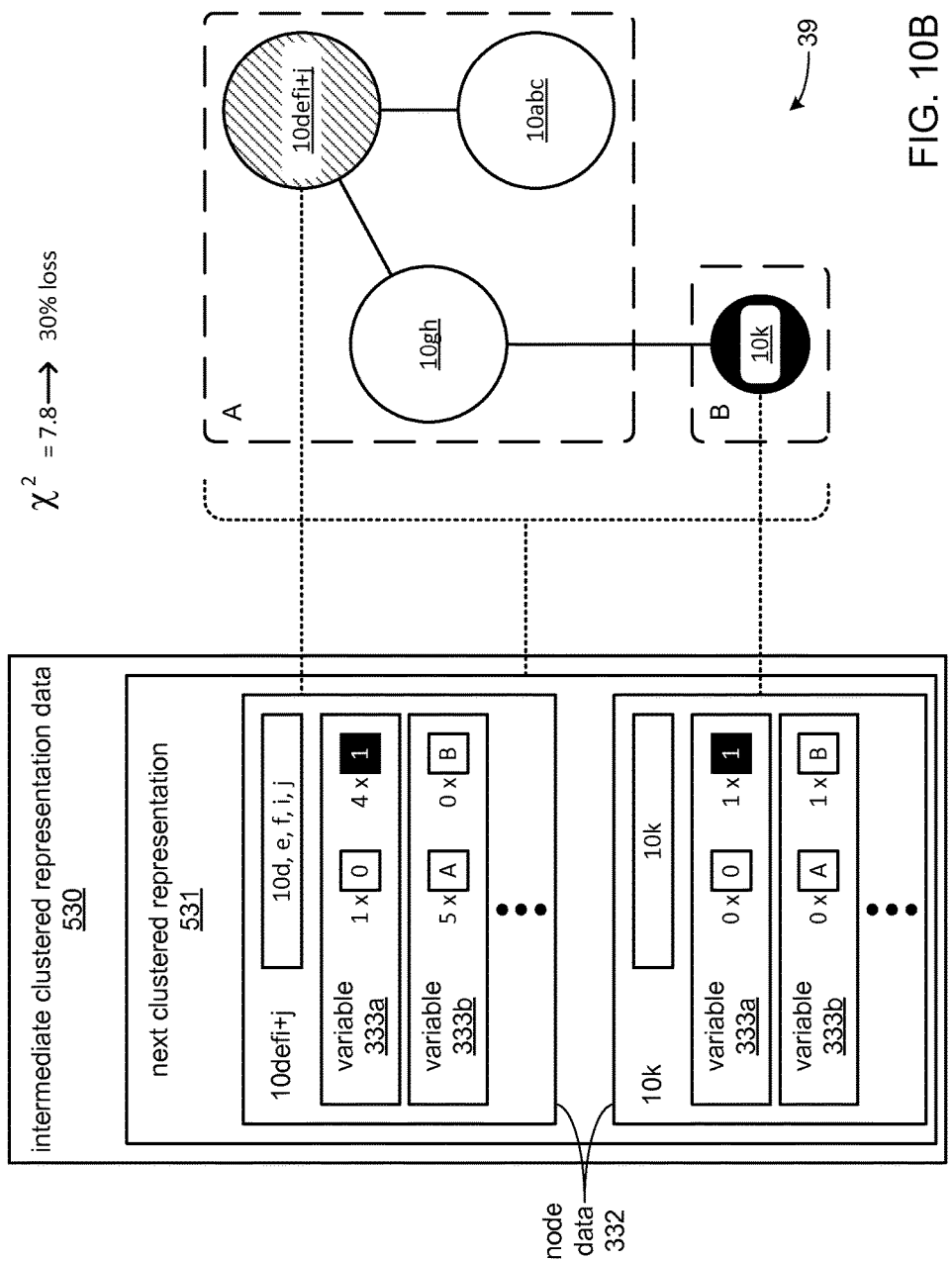
FIG. 10B illustrates an example embodiment of a next clustered representation of the alternate example network of FIG. 10A.

FIGS. 10A and 10B present alternate representations of the same relatively simple example network 19 in an alternate example of generating clustered representations of the network 19 in which another variable 333*b* is used to impose a constraint on which nodes 10 may be combined. More specifically, a constraint may imposed in which ones of the nodes 10 having a value of A for the variable 333*b* are not permitted to be combined with others of the nodes 10 having the value of B for the variable 333B. As recognizable to those skilled in the art, the network 19 may represent a type of network that spans between persons of two different families or organizations of people, that spans between two different buildings on a campus of buildings, or that spans between two different countries or continents, and there may be a desire to preserve the distinction of which nodes 10 are in which of these groups of people, buildings or geographic regions as clustered representation(s) are generated.

FIG. 10A depicts the unclustered representation 331 within the unclustered network representation data 330 at the stage at which none of the nodes 10 of the example network 19 have yet been combined. FIG. 10B depicts a next clustered representation 531 within the intermediate clustered representation data 530 that may be generated during an iteration and which may be selected to become the final clustered representation 731 depending on the specified criteria employed in generating clustered representations. As can be seen in both FIGS. 10A and 10B, the one node 10*k* that has the value of B for the variable 333*b* maintained separately from (e.g., is not combined with) any of the other nodes 10*a* through 10*j* that have the value A for the variable 333*b*.

Returning to FIGS. 1 and 2, the processor component 550 of the computing device 500 may be selected to efficiently determine the degrees of loss of information associated with each of multiple possible combinations of pairs of nodes at least partly in parallel to speed the each selection of a pair of nodes to combine in each iteration. By way of example, the processor component 550 may incorporate a single-instruction multiple-data (SIMD) architecture, may incorporate multiple processing pipelines, and/or may incorporate the ability to support multiple simultaneous threads of execution per processing pipeline. Alternatively or additionally, and as has been discussed, the determination of degrees of loss of information associated with each of multiple combinations of pairs of nodes in parallel may be performed by multiple ones of the computing devices 500 operating at least partly in parallel with each other.

Each of these computing devices may be any of a variety of types of computing device that incorporates at least the processing resources to enable such efficient determination of degrees of loss of information associated with each of multiple possible combinations of pairs of nodes, including for example, a stationary computing device (e.g., a desktop computer or a server), a mobile computing device (e.g., a laptop or notebook computer, a tablet computer, a handheld computer or smartphone, a computer incorporated into a vehicle or other conveyance, or a body-worn computer), a co-processing device augmenting a computing device with the requisite processing resources, etc. Embodiments are not limited in this context.

In various embodiments, each of the processor components 550, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

Although each of the processor components 550, 650 and 750 may include any of a variety of types of processor, it is envisioned that the processor component 650 of the controller 600 of the embodiment of the computing device 500 of FIG. 2 may be somewhat specialized and/or optimized to perform tasks related to graphics, including graphics rendering. More broadly, it is envisioned that the controller 600 serves as a graphics subsystem of the computing device 500 to enable the performance of tasks related at least to graphics rendering, using components separate and distinct from the processor component 550 and its more closely related components.

In various embodiments, each of the storages 560, 660 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interfaces 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 11:
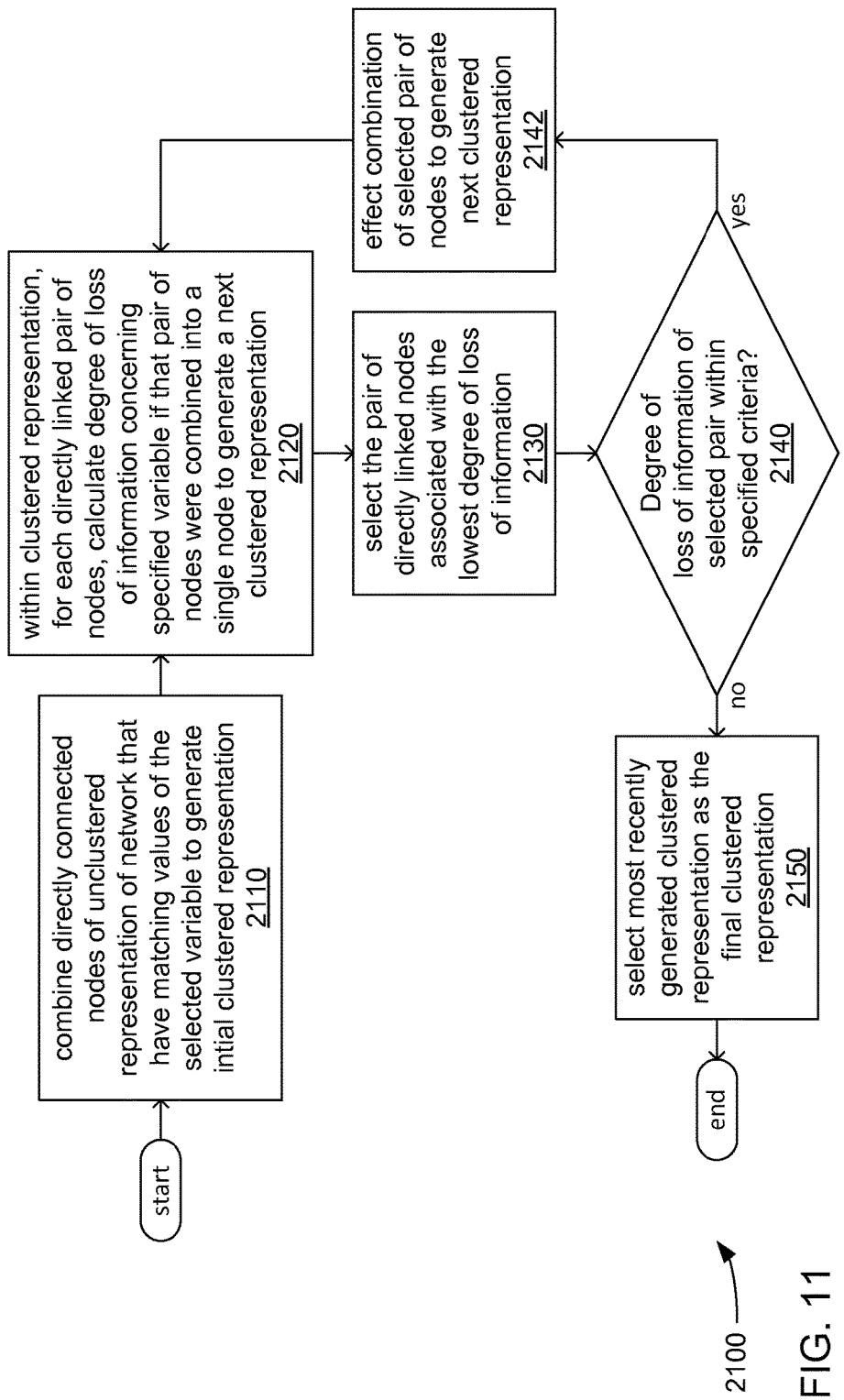
FIG. 11 illustrates an example embodiment of a logic flow of generating a final clustered representation of a network.

FIG. 11 illustrates an example embodiment of a logic flow 2100. The logic flow 2100 may be representative of some or all of the operations executed by one or more embodiments described herein. More specifically, the logic flow 2100 may illustrate operations performed by the processor component 550 in executing the control routine 540, and/or performed by other component(s) of at least the computing device 500.

At 2110, a processor component of a computing device (e.g., the processor component 550 of the computing device 500) may evaluate all directly connected pairs of nodes of an unclustered representation of a network (e.g., the unclustered representation 331) to identify directly connected nodes that share the same value for a specified variable. Then, at each such location, the processor component may combine two or more of such directly connected nodes to form a single node as part of generating an initial clustered representation of the network (e.g., the initial clustered representation 431) from the unclustered representation. As has been discussed, the network that is so represented may be any of a variety of types of network in which the nodes may represent any of a variety of objects or persons, and in which the links between pairs of the nodes may be point-to-point links representing a binary condition of there either being some form of connection between a pair of nodes, or not.

At 2120, the processor component may, for each directly linked pair of nodes of the current clustered representation of the network (e.g., the initial clustered representation 431 at first, and later one of a next clustered representation 531) determine the degree of loss of information concerning the specified variable that would result if that directly linked pair of nodes were combined to generate a next clustered representation of the network. As has been discussed, such a degree of loss associated with each such linked pair of nodes may be determined by comparing a measure of the amount of information concerning the specified variable that would be provided by the version of a next clustered representation generated by combining that pair nodes to an initial measure of the amount of information concerning the specified variable that is provided by the initial clustered representation (or by the unclustered representation, since such measures of both the unclustered representation and the initial clustered representation will be identical). As has also been discussed, such measures of amount of such information may be calculated using any of a variety of statistical measures.

At 2130, the processor component may select the pair of directly linked nodes in the current clustered representation of the network that is associated with the smallest degree of loss of information concerning the specified variable. At 2140, the processor component may determine whether that smallest degree of loss is small enough to fall within a maximum degree of loss of information concerning the specified variable that may be included in specified criteria for controlling the collapsing of the unclustered representation to generate a final clustered representation (e.g., the final clustered representation 731).

If, at 2140, the degree of loss of information associated with the selected pair of nodes is too great such that it does not fall within the maximum degree of loss in the specified criteria, then it may be deemed to not be possible to further collapse the current clustered representation of the network without exceeding that maximum degree of loss. As a result, the processor component may select the current clustered representation (the clustered representation generated most recently) to become the final clustered representation at 2150.

However, if the degree of loss of information associated with the selected pair of nodes does fall within the maximum degree of loss in the specified criteria, then the processor component may effect the combination of the selected pair of nodes at 2142 to generate a next clustered representation, which then becomes the new current clustered representation. The processor component may then repeat the evaluation of each directly linked pair of nodes at 2120 in this new current clustered representation.

Figure 12:
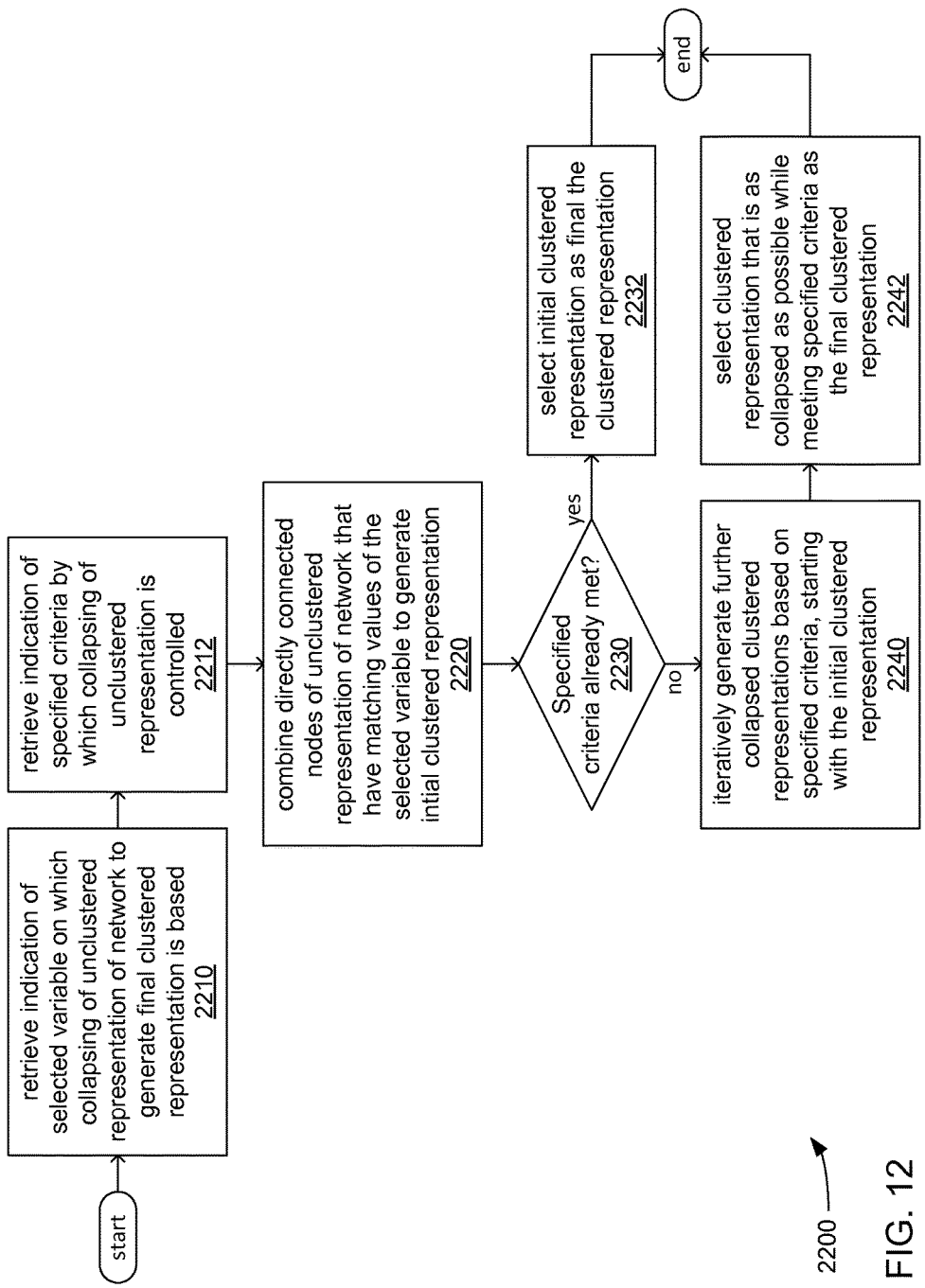
FIG. 12 illustrates another example embodiment of a logic flow of generating a final clustered representation of a network.

FIG. 12 illustrates an example embodiment of a logic flow 2200. The logic flow 2200 may be representative of some or all of the operations executed by one or more embodiments described herein. More specifically, the logic flow 2200 may illustrate operations performed by the processor component 550 in executing the control routine 540, and/or performed by other component(s) of at least the computing device 500.

At 2210, a processor component of a computing device (e.g., the processor component 550 of the computing device 500) may retrieve an indication of what variable among the nodes of a network is specified to be the variable on which the collapsing of an unclustered representation of the network to generate a final clustered representation is to be based (e.g., the collapsing of the unclustered representation 331 to generate the final clustered representation 731). At 2212, the processor component may also retrieve an indication of what criteria are specified to control such collapsing of the unclustered representation. As has been discussed, the specified variable and/or the specified criteria may be provided in settings data received from one or more other computing devices (e.g., the settings data 335 and/or 735).

At 2220, the processor component may evaluate all directly connected pairs of nodes of the unclustered representation to identify directly connected nodes that share the same value for the specified variable. Then, at each such location, the processor component may combine two or more of such directly connected nodes to form a single node as part of generating an initial clustered representation of the network (e.g., the initial clustered representation 431) from the unclustered representation. Again, the network may be any of a variety of types of network in which the nodes may represent any of a variety of objects or persons, and in which the links between pairs of the nodes may be point-to-point links representing a binary condition of there either being some form of connection between a pair of nodes, or not.

At 2230, the processor component may evaluate the initial clustered representation to determine whether it is sufficiently collapsed from the unclustered representation as to already meet the specified criteria. As previously discussed, the generation of the initial clustered representation is performed in a manner that does not entail the loss of information concerning the specified variable. Specifically, measures of the amount of information concerning the specified variable that are provided by the unclustered representation and the initial clustered representation will be identical. Thus, if at 2230, the initial clustered representation already meets the specified criteria, then the initial clustered representation may be selected to become the final clustered representation at 2232.

However, if the initial clustered representation does not meet the specified criteria at 2230, then iterations of collapsing clustered representations may be performed at 2240 in which each iteration may collapse a current clustered representation by generating a next clustered representation in which the next clustered representation has one fewer nodes than the current clustered representation. As has been described, evaluations of the amount of loss of information concerning the specified variable may be used to select which directly linked pair of nodes in each current clustered representation is to be combined into a single node as part of generating the next clustered representation. When the performance of an iteration results in the determination that a clustered representation that meets the specified criteria has been generated, then that clustered representation may be selected to become the final clustered representation at 2242.

Figure 13:
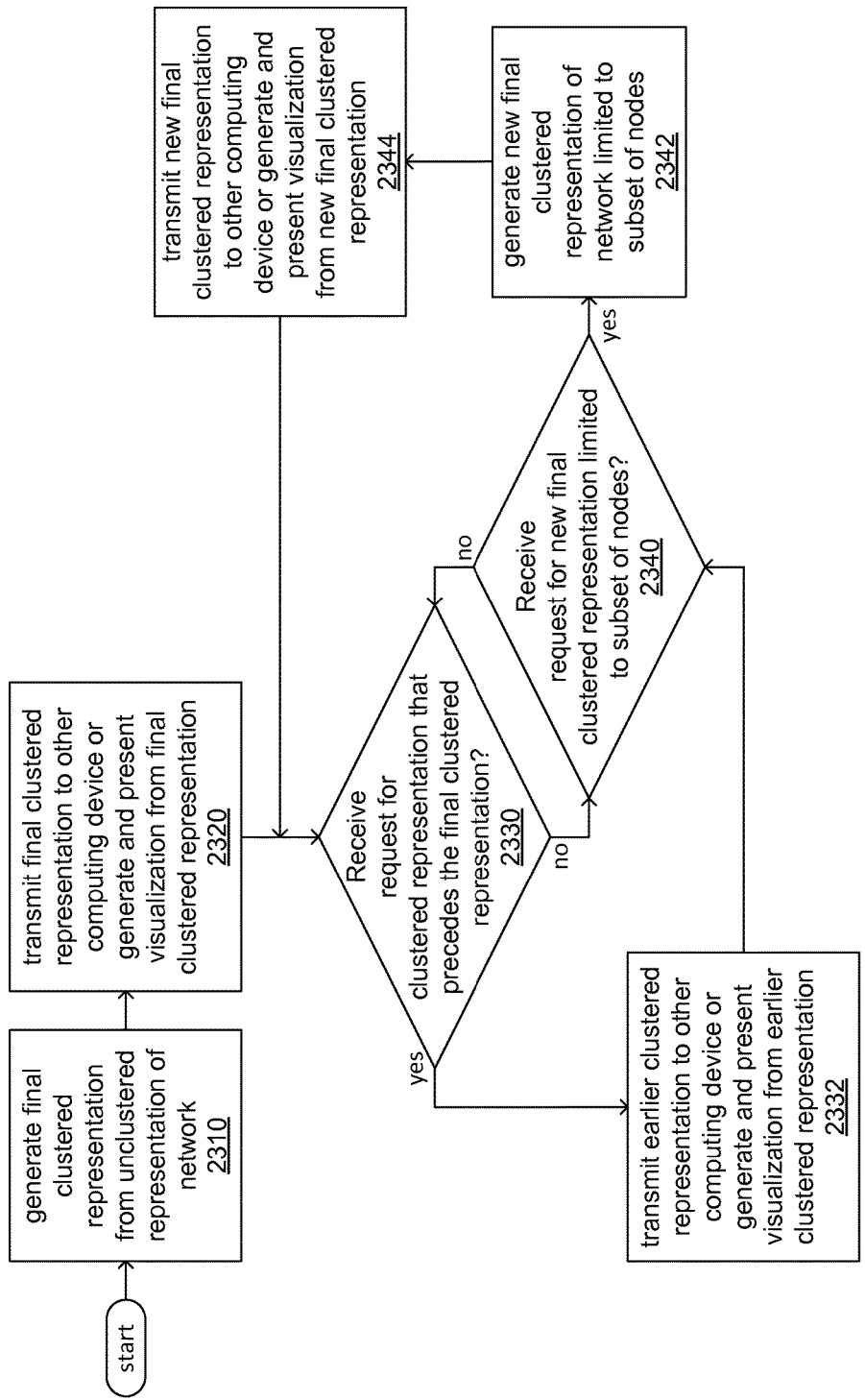
FIG. 13 illustrates an example embodiment of a logic flow of transmitting or presenting a visualization of a final clustered representation of a network.

FIG. 13 illustrates an example embodiment of a logic flow 2300. The logic flow 2300 may be representative of some or all of the operations executed by one or more embodiments described herein. More specifically, the logic flow 2300 may illustrate operations performed by the processor component 550 in executing the control routine 540, and/or performed by other component(s) of at least the computing device 500.

At 2310, a processor component of a computing device (e.g., the processor component 550 of the computing device 500) may generate a final clustered representation of a network employing the approach described above. At 2320, the processor component may operate a network interface of the computing device to transmit a final clustered representation data to another computing device via a network to convey the final clustered representation thereto for presentation in a visualization. Alternatively or additionally, at 2320, the processor component (or a processor component of a controller of the computing device, such as the processor component 650 of the controller 600) may generate a visualization of the network based on the final clustered representation and may present that visualization on a display associated with the computing device (e.g., the display 780).

At 2330, the processor component may check to whether a request has been received for one of the clustered representations of the network that may have been generated as an intermediate clustered representation of the network as part of generating the final clustered representation (e.g., the initial clustered representation 431 or a next clustered representation 531). Such a request may be received from the other computing device, and may require transmission of data conveying such an intermediate clustered representation to that other device via the network. Alternatively, such a request may be received from an operator of the computing device through operation of manually operable controls (e.g., the controls 720).

If, at 2330, such a request has been received, then the processor component may operate the network interface to transmit data conveying such an intermediate clustered representation (e.g., the initial clustered representation data 430 or the intermediate clustered representation data 530) via the network to the other computing device for presentation in a new visualization at 2332. Alternatively or additionally, at 2332, the processor component (or a processor component of the controller) may generate a new visualization of the network based on such an intermediate clustered representation and may present that new visualization on a display associated with the computing device.

Regardless of whether such a request was received at 2330, at 2340, the processor component may check to whether a request has been received for a new final clustered representation of the network that is limited to a subset of nodes. Such a request may arise during presentation of a visualization generated from the original final clustered representation of the network as a result of a viewer of that presentation desiring to understand an aspect of data associated with the specified subset of the nodes of the network. Such a request may be received from the other computing device, and may require transmission of data conveying such a new final clustered representation to that other device via the network. Alternatively, such a request may be received from an operator of the computing device through operation of the manually operable controls.

If, at 2340, such a request has been received, then the processor component may generate the new final clustered representation of the network (limited to the subset of the nodes of that network specified in the request) employing the approach described above at 2342. At 2344, the processor component may operate the network interface to transmit data conveying the new final clustered representation via the network to the other computing device for presentation in a new visualization. Alternatively or additionally, at 2342, the processor component (or a processor component of the controller) may generate a new visualization of the network based on the new final clustered representation and may present that new visualization on the display associated with the computing device.

Regardless of whether such a request was received at 2340, at 2330, the processor component may repeat the check to whether a request has been received for one of the clustered representations of the network that may have been generated as an intermediate clustered representation of the network as part of generating the final clustered representation.

Figure 14:
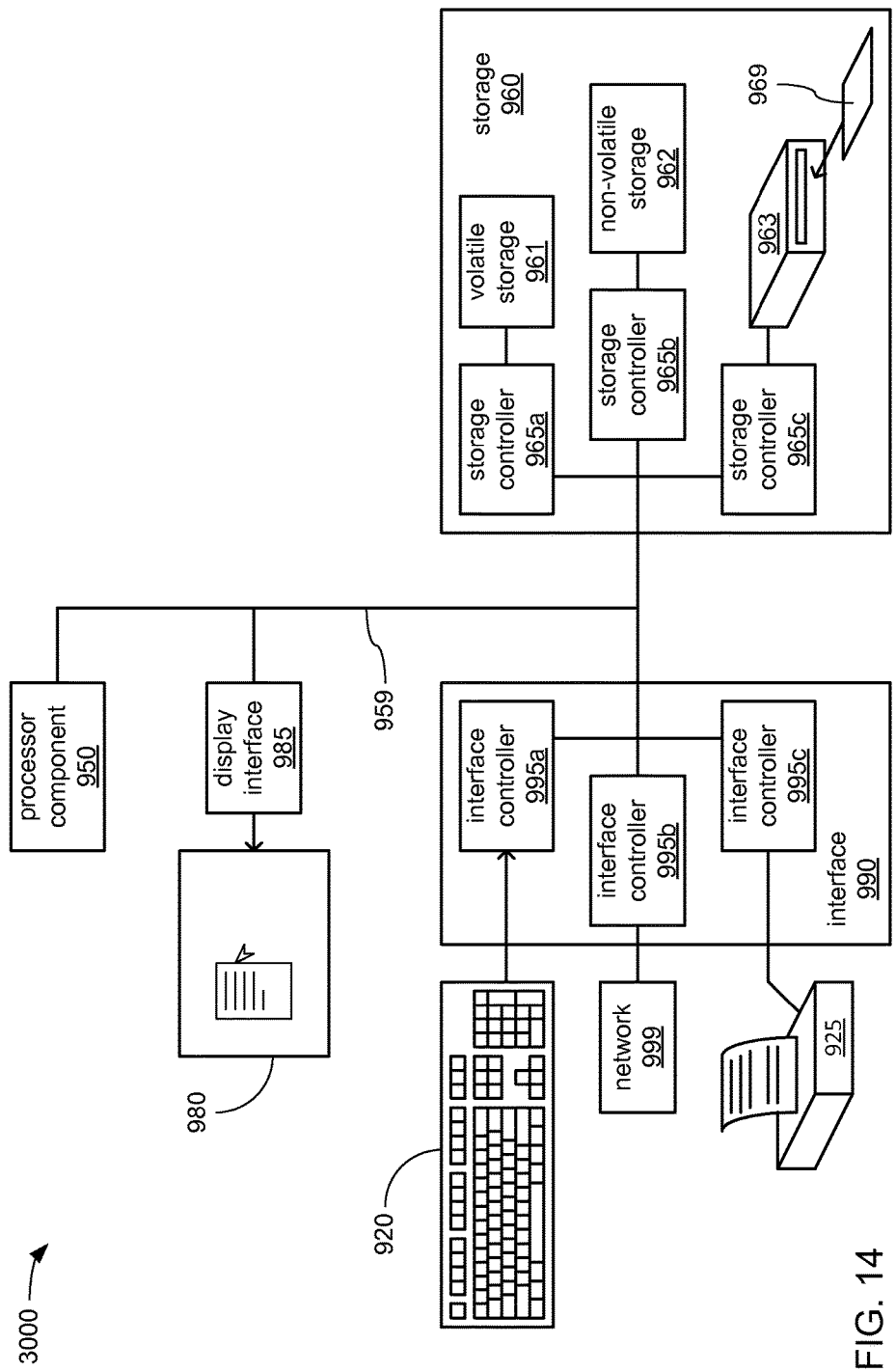
FIG. 14 illustrates an example embodiment of a processing architecture.

FIG. 14 illustrates an example embodiment of a processing architecture 3000 suitable for implementing various embodiments as previously described. More specifically, the processing architecture 3000 (or variants thereof) may be implemented as part of one or more of the computing devices 300*a-e*, 500 or 700, or the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 550, 650 and 750) may include any of a wide variety of commercially available processors, employing any of a wide variety of technologies and implemented with one or more cores physically combined in any of a number of ways.

As previously discussed, the storage 960 (corresponding to one or more of the storages 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to one or both of the network interfaces 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless timings and/or protocols to access other computing devices through the depicted network 999 (perhaps a network made up of one or more links, smaller networks, or perhaps the Internet). The interface controller 995*c* may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a computing device to perform operations including:
   receive, at the computing device and from an input device, an indication of a specified variable for which each node of a network is associated with a value;
   receive, at the computing device and from the input device, an indication of one or more specified criteria to select a final clustered representation of the network, the one or more specified criteria comprising a maximum degree of loss of information concerning the specified variable associated with the final clustered representation;
   operations of an iteration of derivation of the final clustered representation, wherein the operations of the iteration comprise:
      calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network;
      selecting one of the possible combinations of two linked nodes of the current clustered representation that is associated with a smallest degree of loss of information concerning the specified variable to combine into a single node;
      determining whether to cease performance of iterations based on whether the smallest degree of loss associated with the selected combination exceeds the maximum degree of loss of information;
      effecting the selected combination of two linked nodes of the current clustered representation to generate the next clustered representation in response to a determination that the smallest degree of loss does not exceed the maximum degree of loss; and
      selecting the current clustered representation as the final clustered representation in response to a determination that the smallest degree of loss exceeds the maximum degree of loss;
   generate a visualization of the network based on the final clustered representation; and
   transmit the visualization to a display.

2. The computer-program product of claim 1, the computing device caused to perform operations including, prior to performance of the iteration, combine at least two nodes of an unclustered representation of the network to generate an initial clustered representation of the network, wherein:
   each node of the unclustered representation represents a single node of the network;
   there is no loss of information concerning the specified variable in generating the initial clustered representation from the unclustered representation; and
   the current clustered representation comprises the initial clustered representation in a first iteration.

3. The computer-program product of claim 2, the computing device caused to perform operations including determine during an iteration whether the one or more specified criteria have been reached based at least on a comparison of quantities of nodes in the next clustered representation and the unclustered representation.

4. The computer-program product of claim 1, wherein the one or more specified criteria comprises a specified maximum quantity of nodes within the final clustered representation.

5. The computer-program product of claim 1, wherein the specified variable comprises a binary variable, and operations to calculate the degree of loss of information concerning the specified variable arising from each possible combination of two linked nodes of the current clustered representation into a single node comprise a chi-squared analysis.

6. The computer-program product of claim 1, wherein the specified variable comprises a continuous range of values, and operations to calculate the degree of loss of information concerning the specified variable arising from each possible combination of two linked nodes of the current clustered representation into a single node comprise a F-test.

7. The computer-program product of claim 1, the computing device caused to perform operations including monitor the input device for an indication of manual operation to provide the one or more specified criteria.

8. The computer-program product of claim 1, the computing device caused to perform operations including
determine at least one of a shading or a color with which to present at least one of the nodes of the final clustered representation based on whether the node is associated with multiple values for the specified variable.

9. The computer-program product of claim 8, wherein the one or more specified criteria comprises a maximum quantity of nodes to include in the visualization and the maximum quantity of nodes is based on a pixel resolution of the display.

10. The computer-program product of claim 1, the computing device caused to perform operations including exchange at least one of an indication of the specified variable, an indication of the one or more specified criteria, an unclustered representation of the network in which each node of the unclustered representation represents a single node of the network, or the final clustered representation of the network with another device.

11. The computer-program product of claim 1, the network represented by at least the current clustered representation comprising at least one of a telecommunications network, a network of computing devices, a social network of people, a network of interpersonal or professional relationships between people, a map of propagation of information or a map of interactions among genes of a genetic sequence.

12. A computer-implemented method comprising:
receiving, at the computer and from an input device, an indication of a specified variable for which each node of a network is associated with a value;
receiving, at the computer and from the input device, an indication of one or more specified criteria to select a final clustered representation of the network, the one or more specified criteria comprising a maximum degree of loss of information concerning the specified variable associated with the final clustered representation;
performing an iteration of derivation of the final clustered representation, wherein performing the iteration comprises:
calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network;
selecting one of the possible combinations of two linked nodes of the current clustered representation that is associated with a smallest degree of loss of information concerning the specified variable to combine into a single node;
determining whether to cease performance of iterations based on whether the smallest degree of loss associated with the selected combination exceeds the maximum degree of loss of information;
effecting the selected combination of two linked nodes of the current clustered representation to generate the next clustered representation in response to a determination that the smallest degree of loss does not exceed the maximum degree of loss; and
selecting the current clustered representation as the final clustered representation in response to a determination that the smallest degree of loss exceeds the maximum degree of loss;
generating a visualization of the network based on the final clustered representation; and
transmitting the visualization to a display.

13. The computer-implemented method of claim 12, comprising combining, prior to performance of the iteration, at least two nodes of an unclustered representation of the network to generate an initial clustered representation of the network, wherein:
each node of the unclustered representation represents a single node of the network;
there is no loss of information concerning the specified variable in generating the initial clustered representation from the unclustered representation; and
the current clustered representation comprises the initial clustered representation in a first iteration.

14. The computer-implemented method of claim 13, comprising determining during an iteration whether the one or more specified criteria has been reached based at least on a comparison of quantities of nodes in the next clustered representation and the unclustered representation.

15. The computer-implemented method of claim 12, wherein the one or more specified criteria comprises a specified maximum quantity of nodes within the final clustered representation.

16. The computer-implemented method of claim 12, wherein the specified variable comprises a binary variable, and calculating the degree of loss of information concerning the specified variable arising from each possible combination of two linked nodes of the current clustered representation into a single node comprises performing a chi-squared analysis.

17. The computer-implemented method of claim 12, wherein the specified variable comprises a continuous range of values, and calculating the degree of loss of information concerning the specified variable arising from each possible combination of two linked nodes of the current clustered representation into a single node comprises performing a F-test.

18. The computer-implemented method of claim 12, wherein:
each node of the current clustered representation is associated with a value of another variable; and
the iteration comprises:
limiting calculation of degree of loss of information concerning the specified variable to possible combinations of two of the nodes of the current clustered representation in which the two nodes have matching values for another variable and
limiting selection of the selected one of the possible combinations to possible combinations of two of the nodes of the current clustered representation in which the two nodes have matching values for the other variable.

19. The computer-implemented method of claim 12, comprising
generating a visualization of the network based on the final clustered representation.

20. The computer-implemented method of claim 19, wherein the one or more specified criteria comprises a maximum quantity of nodes to include in the visualization and the maximum quantity of nodes is based on a pixel resolution of the display.

21. The computer-implemented method of claim 12, wherein each node of the network comprises at least one of a person, a computing device, a telecommunications device, a gene, an organization, or an account maintained with an organization and associated with a person or another organization.

22. An apparatus comprising:
a processor component;
a communications component for execution by the processor component to receive, from an input device, an indication of a specified variable for which each node of a network is associated with a value, and to receive, from the input device, an indication of one or more specified criteria to select a final clustered representation of the network, the one or more specified criteria comprising a maximum degree of loss of information concerning the specified variable associated with the final clustered representation; and
an iterative collapse component for execution by the processor component to perform an iteration of derivation of the final clustered representation, wherein performing the iteration comprises:
calculating a degree of loss of information concerning the specified variable arising from each possible combination of two linked nodes of multiple nodes of a current clustered representation of the network into a single node to generate a next clustered representation of the network, wherein each node of the clustered representation represents at least one node of the network;
selecting one of the possible combinations of two linked nodes of the current clustered representation that is associated with a smallest degree of loss of information concerning the specified variable to combine into a single node;
determining whether to cease performance of iterations based on whether the smallest degree of loss associated with the selected combination exceeds the maximum degree of loss of information;
effecting the selected combination of two linked nodes of the current clustered representation to generate the next clustered representation in response to a determination that the smallest degree of loss does not exceed the maximum degree of loss; and
selecting the current clustered representation as the final clustered representation in response to a determination that the smallest degree of loss exceeds the maximum degree of loss; and
a rendering component for execution by the processor component to generate a visualization of the network based on the final clustered representation and to transmit the visualization to a display.

23. The apparatus of claim 22, comprising an initial collapse component for execution by the processor to combine, prior to performance of the iteration, at least two nodes of an unclustered representation of the network, wherein:
each node of the unclustered representation represents a single node of the network;
there is no loss of information concerning the specified variable in generating the initial clustered representation from the unclustered representation; and
the current clustered representation comprises the initial clustered representation in a first iteration.

24. The apparatus of claim 23, the iterative collapse component comprising an iteration control component to determine during an iteration whether the one or more specified criteria has been reached based at least on a comparison of quantities of nodes in the next clustered representation and the unclustered representation.

25. The apparatus of claim 22, wherein the one or more specified criteria comprises a specified maximum quantity of nodes within the final clustered representation.

26. The apparatus of claim 22, wherein the specified variable comprises a binary variable and the iterative collapse component comprises a pair calculation component to perform a chi-squared analysis to calculate the degree of loss of information concerning the specified variable arising from each possible combination of two linked nodes of the current clustered representation into a single node.

27. The apparatus of claim 22, wherein the specified variable comprises a continuous range of values and the iterative collapse component comprises a pair calculation component to perform a F-test to calculate the degree of loss of information concerning the specified variable arising from each possible combination of two linked nodes of the current clustered representation into a single node.

28. The apparatus of claim 22, wherein:
each node of the current clustered representation is associated with a value of another variable;
during the iteration, the iterative collapse calculation component limits calculation of degree of loss of information concerning the selected variable to possible combinations of two of the nodes of the current clustered representation in which the two nodes have matching values for another variable; and
during the iteration, the collapse selection component limits selection of the selected one of the possible combinations to possible combinations of two of the nodes of the clustered representation in which the two nodes have matching values for the another variable.

29. The apparatus of claim 28, wherein another variable comprises at least one of geography of each node and family affiliation of each node.

30. The apparatus of claim 22, comprising a user interface component for execution by the processor component to monitor the input device for an indication of manual operation to provide the one or more specified criteria.

31. The apparatus of claim 22, the rendering component to determine at least one of a shading or a color with which to present at least one of the nodes of the final clustered representation based on whether the node is associated with multiple values for the specified variable.

32. The apparatus of claim 31, comprising the display, wherein the one or more specified criteria comprises a maximum quantity of nodes to include in the visualization and the maximum quantity of nodes is based on a pixel resolution of the display.

33. The apparatus of claim 22, comprising:
a network interface to couple the processor component to a device; and
the communications component to exchange at least one of an indication of the specified variable, an indication of the one or more specified criteria, an unclustered representation of the network in which each node of the unclustered representation represents a single node of the network, or the final clustered representation of the network with the other device.

* * * * *